United States Patent [19]
Tomonaga et al.

[11] Patent Number: 5,696,759
[45] Date of Patent: Dec. 9, 1997

[54] APPARATUS FOR HIGH-SPEED PACKET SWITCHING IN A BROADBAND ISDN

[75] Inventors: Hiroshi Tomonaga; Naoki Matsuoka; Masaaki Kawai, all of Kawasaki, Japan

[73] Assignee: Fujitsu Limited, Kanagawa, Japan

[21] Appl. No.: 554,038

[22] Filed: Nov. 6, 1995

[30] Foreign Application Priority Data

Dec. 15, 1994 [JP] Japan ................... 6-311412

[51] Int. Cl.$^6$ .......................... H04L 12/56; H04L 12/26
[52] U.S. Cl. ...................... 370/244; 370/253; 370/397
[58] Field of Search ...................... 370/60, 60.1, 94.2, 370/79, 13, 17, 68.1, 110.1, 233, 235, 236, 395, 397, 399, 522, 244, 253; 371/5.1, 5.5; 359/117, 137, 139

[56] References Cited

U.S. PATENT DOCUMENTS

| | | | |
|---|---|---|---|
| 5,317,563 | 5/1994 | Oouchi et al. | 370/60 |
| 5,461,607 | 10/1995 | Miyagi et al. | 370/16 |
| 5,488,606 | 1/1996 | Kakuma et al. | 370/60.1 |
| 5,504,742 | 4/1996 | Kakuma et al. | 370/68.1 |
| 5,535,196 | 7/1996 | Aihara et al. | 370/60 |

OTHER PUBLICATIONS

Day, "International Standardization of BISDN", IEEE LTS, Aug. 1991, pp. 13–20.
B.E. Basch, et al. "VISTAnet: A BISDN Field Trial", IEEE LTS, Aug. 1991, pp. 22, 25–30.
A. Takahashi et al., "A Broadband Switching System for Public Network", ISS, May 1990, vol. V, pp. 103–109.
Y. Kato et al., "A VLSIC for the ATM Switching System", ISS, May 1990, vol. III, pp. 27–32.
K. Hajikano et al., "Asynchronous Transfer Mode Switching Architecture for Broadband ISDN", ICC, Jun. 1988, pp. 0911–1015.
K. Chipman et al., "High Performance Applications Development for B–ISDN", ISS, Oct. 1992, pp. 22–26.
H. Tomonaga et al., "High–speed Switching Module for a Large Capacity ATM System", IEEE, Dec. 1992, pp. 123–127.
Y. Doi et al., "A 160 Gbit/s Large–Capacity ATM Switching System using a Dynamic Link Speed Controlled Switch Architecture", IEEE, 1993, pp. 24–28.
Y. Doi et al., "An ATM Switch using Multichip Module Technology", SSE, Nov. 1991, pp. 91–109 (Abstract).
S. Sasaki et al., "Multi–chip Module Packagking Technology for Communication Switching Systems", SSE, Nov. 1991, pp. 91–110 (Abstract).
K. Endo et al., "A Full–matrix Large ATM Switch constructed by Small Size Switch Elements with Control Point Switching Scheme", SSE, 1993 (introduc.).
H. Tomonaga et al., "A Structure of Ultrahigh–Speed ATM Switch", SSE, Nov. 1993, pp. 793–800 (Abstract).
H. Tomonaga et al., "A Line Interface Structure for a Large Capacity ATM Switching System", SSE, Apr. 1994, pp. 4–6 (Abstract).

*Primary Examiner*—Chau Nguyen
*Attorney, Agent, or Firm*—Helfgott & Karas, P.C.

[57] ABSTRACT

A switching equipment accommodates lines and includes a line interface for processing data from the line on the unit of cell. The line interface has a basic processing unit and an additional processing unit. The basic processing unit performs a basic process on the cell. The additional processing unit separated from the basic processing unit but disconnectably connected to the basic processing unit executes an additional process on the cell. The additional processing unit includes a plurality of processing blocks for effecting a plurality of additional processes on the cells. Each processing block is individually disconnectably connected to the basic processing unit. The basic processing unit includes a selecting portion for selecting, when one or more processing blocks within the additional processing unit are connected, the connected processing blocks and performing the additional process on the cell.

21 Claims, 23 Drawing Sheets

CONTROL DATA B

ACCOUNTING INVALID bit
UPC INVALID bit
OAM INVALID bit

APPARATUS FOR HIGH-SPEED PACKET SWITCHING IN A BROADBAND ISDN

BACKGROUND OF THE INVENTION

The present invention relates to a switching equipment for performing a switching process of a high-speed packet (cell) in a broadband ISDN (Integrated Services Digital Network).

The broadband ISDN is capable of offering a variety of multimedia for voices, data and motion pictures. Further, an ATM switching equipment transfers the data on a cell unit in an asynchronous transfer mode (ATM) and is applicable to a wide range of communications from a low speed to a high speed. Accordingly, in the broadband ISDN, lines composed of optical fibers are connected to the ATM switching equipment.

In this broadband ISDN at an early stage, a band width that is, it is predicted, employed by a subscriber is on the order of several Mbps. If the number of subscribers is small, it is enough that the ATM switching equipment accommodates, e.g., 50 to 100 lines of 150 Mbps circuits. Also, if the number of subscribers is small, as illustrated in FIG. 20, a transmission system 57 provided in front of an ATM switching equipment 10 performs multiplex processing. The lines are thereby effectively utilized.

Further, when the transmission system 57 effects the multiplex processing, and if a fault happens in the broadband ISDN, a damage is large. Therefore, as illustrated in FIG. 21, the transmission systems 57, subscriber line interfaces 103, switches 104 and transit line interfaces 30 are dualized in an active system and a standby system. If the trouble happens, the system is switched over from the active system to the standby system.

The above line interface 103 is an interface for converting signals transmitted with a synchronous digital hierarchy (SDH) from the subscriber's terminal 101 into an ATM format and transmitting the signals to the switch 104. The switch 104 switches over an internal signal path in order to transmit the generated cells based on the ATM format to one of transit lines.

Herein, in the line interface shown in FIG. 22, an opto-electric/electro-optic (OE/EO) converting portion 11 converts a photo signal from a subscriber line 53 composed of the optical cable into an electric signal or reversely converts the electric signal into the photo signal. A synchronous digital hierarchy (SDH) terminal portion 12 terminates an SDH format transmitted via the transmission system 57 from the subscriber's terminal 101. The SDH format is a format in which a thickness (i.e., a channel capacity) of the transmission path is divided into hierarchies (several stages), i.e., into physical layers so that the signals can be efficiently flexibly transmitted on the occasion of multiplexing through the transmission system 57.

FIG. 23 shows the SDH format. An SDH frame is structured such that there are provided nine rows lengthwise, and a section overhead (SOH) as 9-octet control data and a 261-octet virtual container (VC-4) crosswise are provided. Based on this frame structure, an SDH basic bit rate is unified into 155.52 Mbits/s.

FIG. 24 illustrates cell mapping to the SDH frame. In FIG. 24, the SDH frame contains path overhead (POH) as an item of control data added to the virtual container. The SDH frame is mapped to an ATM cell consisting of a header and an item of user data.

A cell synchronous portion 13 effects cell error control on the basis of header error control data written to a cell header and carries out a cell synchronous detection in order to reduce a cell loss due to the fact that a transmission path dot error turns out an ATM cell header error. A using quantity parameter control (UPC) portion 14, i.e., a band management portion, manages a band width that should be employed by the user by monitoring a traffic density.

An accounting portion 15 counts the cells and notifies the processor of data thereof as an item of accounting data. An alarm transfer cell managing (Operation And Maintenance:OAM) portion 16 manages an alarm transfer cell. A monitoring cell (MC) portion 17 monitors a cell quality by measuring a cell error characteristic, a cell loss characteristic and a cell delay characteristic by use of the MC cell.

A VPI/VCI conversion table 180 stores a virtual channel identifier (VCI) and a virtual path identifier (VPI) that are inputted so as to make them corresponding to an output destination virtual channel identifier and an output destination virtual path identifier.

A VPI/VCI (header) converting portion 18 reads the virtual channel identifier and the virtual path identifier that are written to the cell header. The VPI/VCI converting portion 18 converts the virtual path identifier into the output destination virtual path identifier and further converts the virtual channel identifier into the output destination channel identifier with reference to the VPI/VCI conversion table 180.

An output destination path is determined per cell by these output destination virtual channel and path identifiers. A microprocessor 19 controls the UPC portion 14, the accounting portion 15, the OAM portion 16, the MC portion 17 and the VPI/VCI converting portion 18.

However, a multiplicity of LSIs were mounted in the line interface in order to actualize the above-mentioned highly sophisticated function. Further, if the number of subscribers to the broadband ISDN increases, the number of the line interfaces also increases. This results in a rise in size of the line interface.

Moreover, in case the subscriber line is multiplexed but is not dualized, and if a trouble happens in a certain line interface, the line corresponding to this line interface is closed. This conduces to a problem in which all the multiplexed subscriber lines can not be used.

SUMMARY OF THE INVENTION

It is a primary object of the present invention to provide a switching equipment contrived to attain downsizing of a line interface.

<First Invention>

A switching equipment according to the present invention performs a switching process of a cell having a fixed length that is composed of data and a cell header. The switching equipment comprises a line interface which accommodates lines and processes the data from the line on the unit of cell. The line interface includes a basic processing unit and an additional processing unit.

The basic processing unit effects a basic process on the cell. The basic processing unit, e.g., performs a cell synchronous detection by controlling cell error control or measures a cell error characteristic, a cell loss characteristic and a cell delay characteristic by using MC cell.

The additional processing unit is separated from the basic processing unit but disconnectably connected to the basic processing unit. The additional processing unit performs an additional process, e.g., an accounting process on the cell.

The first invention is to be established in such a case as to include additional constructive elements which follow.

The additional processing unit includes a plurality of processing blocks for performing a plurality of additional processes on the cell. Each processing block is individually disconnectably connected to the basic processing unit.

The basic processing unit further includes a selecting portion for selecting, when one or more processing blocks within the additional processing unit are connected, the connected processing blocks and performing an additional process on the cell.

The additional processing unit includes, as the plurality of processing blocks, a UPC (band management portion), an accounting portion and a VCI converting portion. The UPC portion manages a band width which should be used the subscriber of the subscriber's terminal by monitoring a flow quantity of the cells. The accounting portion collects pieces of accounting data by counting the number of cells. The VCI converting portion converts a virtual channel identifier written to the cell header contained in the cell into an output destination virtual channel identifier.

The basic processing unit includes a terminal portion, a cell synchronous portion, an alarm transfer cell management (OAM) portion, a monitoring cell (MC) portion and a virtual path identifier (VPI) converting portion.

The terminal portion terminates a transmission format of the data sent via the line. The cell synchronous portion connected to the terminal portion performs a cell synchronous detection by effecting cell error control on the basis of an item of header error control data written to the cell header contained in the cell.

The alarm transfer cell management (OAM) portion connected to the cell synchronous portion manages an alarm transfer cell. The monitoring cell (MC) portion connected to the alarm transfer cell management portion measures at least one of a cell error characteristic, a cell loss characteristic and a cell delay characteristic by use of a monitoring cell. The VPI converting portion connected to the monitoring cell portion converts a virtual path identifier written to the cell header contained in the cell into an output destination virtual path identifier.

The additional processing unit includes an additional executing portion and a storage portion. The additional executing portion executes the additional process on the cell and is already connected to the basic processing unit. The storage portion stores data needed for the additional executing portion to execute the additional process and is separated from the basic processing unit but disconnectably connected to the basic processing unit.

The basic processing unit includes a first processing portion for executing the process on the cell in real time and a second executing portion for executing the process on the cell while permitting a time lag. The second processing portion incorporates the additional executing portion. The second processing portion has a cell extracting portion, a cell processing portion and a cell inserting portion. The cell extracting portion extracts header data contained the cell and alarm transfer cell data. The cell processing portion performs a plurality of processes on the basis of the header data and the alarm transfer cell data that are extracted by the cell extracting portion. The cell inserting portion controls the cell transmitted from the cell extracting portion on the basis of a result of the processing by the cell processing portion and inserts the alarm transfer cell data.

The storage portion includes a plurality of storage blocks for storing data required for performing a plurality of additional processes on the cells. Each storage block is individually disconnectably connected to the basic processing unit.

The cell processing portion further includes a header processing portion. The header processing portion selects, when the one or more storage blocks are connected, the connected storage blocks on the basis of the header data and the alarm transfer cell data that are extracted by the cell extracting portion and effects the additional processes by use of the data in the selected storage blocks.

The cell processing portion includes a band management portion, a header converting portion, an accounting portion and an alarm transfer cell management portion. The band management portion manages a band width to be used by the subscriber by giving an indication to dispose of the cells if the number of cells exceeds a predetermined quantity on the basis of the header data. The header converting portion converts the virtual path identifier and the virtual channel identifier within the header data into an output destination virtual path identifier and an output destination virtual channel identifier. The accounting portion collects pieces of accounting data by counting the number of cells. The alarm transfer cell management portion manages the alarm transfer cell data.

<Second Invention>

A switching equipment according to a second invention performs a switching process of a cell having a fixed length that is composed of data and a cell header. The switching equipment comprises a line interface which accommodates a plurality of lines and processes the data from the respective lines on the unit of cell. The line interface includes individual units and a common unit.

The individual units connected respectively to the plurality of lines accommodated therein individually perform a cell process. The common unit connected to the individual units batch-processes the cells processed by the individual units. The common unit has a basic processing unit and an additional processing unit. The basic processing unit effects a basic process on the cell. The additional processing unit separated from the basic processing unit but disconnectably connected to the basic processing unit effects an additional process on the cell.

Further, the second invention is to be established in such a case as to include additional constructive elements which follow. The additional processing unit includes a plurality of processing blocks for executing a plurality of additional processes on the cells. Each processing block is individually disconnectably connected to the basic processing unit.

The basic processing unit further includes a selecting portion. The selecting portion selects, when the one or more processing blocks within the additional processing unit are connected, the connected processing blocks and performs the additional processes on the cells.

The additional processing unit includes, as the plurality of processing blocks, a UPC portion, an accounting portion and a VCI converting portion. The UPC portion manages a band width which should be used the subscriber of the subscriber's terminal by monitoring a flow quantity of the cells. The accounting portion collects pieces of accounting data by counting the number of cells. The VCI converting portion converts a virtual channel identifier written to the cell header contained in the cell into an output destination virtual channel identifier.

The basic processing unit within the common unit includes an OAM portion for managing an alarm transfer cell, an MC portion and a VCI converting portion. The MC portion connected to the OAM portion measures at least one of a cell error characteristic, a cell loss characteristic and a cell delay characteristic by use of a monitoring cell. The VPI converting portion converts a virtual path identifier written to the cell header contained in the cell into an output destination virtual path identifier.

Each individual unit includes a terminal portion and a cell synchronous portion. The terminal portion terminates a transmission format of the data sent via the line. The cell synchronous portion connected to the terminal portion performs a cell synchronous detection by effecting cell error control on the basis of an item of header error control data written to the cell header contained in the cell.

The additional processing unit includes an additional executing portion and a storage portion. The additional executing portion executes the additional process on the cell and is already connected to the basic processing unit. The storage portion stores data needed for the additional executing portion to execute the additional process is separated from the basic processing unit but disconnectably connected to the basic processing unit.

The basic processing unit includes a first processing portion for executing the process on the cell in real time and a second executing portion for executing the process on the cell while permitting a time lag. The second processing portion incorporates the additional executing portion. The second processing portion has a cell extracting portion, a cell processing portion and a cell inserting portion. The cell extracting portion extracts header data contained the cell and alarm transfer cell data. The cell processing portion performs a plurality of processes on the basis of the header data and the alarm transfer cell data that are extracted by the cell extracting portion. The cell inserting portion controls the cell transmitted from the cell extracting portion on the basis of a result of the processing by the cell processing portion and inserts the alarm transfer cell data.

The storage portion includes a plurality of storage blocks for storing data required for performing a plurality of additional processes on the cells. Each storage block is individually disconnectably connected to the basic processing unit.

The cell processing portion further includes a header processing portion. The header processing portion selects, when the one or more storage blocks are connected, the connected storage blocks on the basis of the header data and the alarm transfer cell data that are extracted by the cell extracting portion and effects the additional processes by use of the data in the selected storage blocks.

The cell processing portion includes a band management portion, a header converting portion, an accounting portion and an alarm transfer cell management portion. The band management portion manages a band width to be used by the subscriber by giving an indication to dispose of the cells if the number of cells exceeds a predetermined quantity on the basis of the header data. The header converting portion converts the virtual path identifier and the virtual channel identifier within the header data into an output destination virtual path identifier and an output destination virtual channel identifier. The accounting portion collects pieces of accounting data by counting the number of cells. The alarm transfer cell management portion manages the alarm transfer cell data.

The storage portion includes a band management memory, an accounting memory and a virtual channel memory. The band management memory stores the data needed for the processing by the band management portion. The accounting memory stores the accounting data required for the processing by the accounting portion. The virtual channel memory stores the data required for converting the virtual channel identifier by the header converting portion.

<Third Invention>

Further, a switching equipment according to a third invention performs a switching process of a cell having a fixed length that is composed of data and a cell header. The switching equipment comprises a line interface which accommodates a plurality of lines and processes the data from the respective lines on the unit of cell. The line interface includes individual units and a common unit. The individual units connected respectively to the plurality of lines accommodated therein individually perform a cell process. The common unit connected to the individual units batch-processes the cells processed by the individual units.

Each individual unit has a control portion for adding, to a cell header contained in the cell, an identification flag for identifying the individual unit itself and an item of control data indicating whether or not the cell should be processed per the individual unit. The cell processing portion determines whether or not the cell should be processed per line on the basis of an identification flag and control data that are added to a cell header in the cell transmitted from a control portion within each individual unit.

The control portion adds, to the cell header, the control data indicating whether or not the cell should be processed per virtual path identifier added to the cell header in each of the cells sequentially inputted to each individual unit. The cell processing portion determines whether or not the cell should be processed per virtual path identifier on the basis of the control data added to the cell header in the cell transmitted from the control portion within each individual unit.

<Fourth Invention>

Further, a switching equipment according to a fourth invention performs a switching process of a cell having a fixed length that is composed of data and a cell header. The switching equipment comprises a line interface which accommodates lines and processes the data from the line on the unit of cell. The line interface includes a control portion and a cell processing portion. The control portion adds control data indicating whether or not the cell should be processed per virtual path identifier added to the cell header contained in each of the cells sequentially inputted. The cell processing portion determines whether or not the cell should be processed based on the control data added to the cell header within the cell transmitted from the control portion.

The control portion adds, to the cell header, the control data indicating whether or not the cell should be processed per virtual path identifier added to the cell header in each of the cells sequentially inputted. The cell processing portion determines whether or not the cell should be processed per virtual path identifier on the basis of the control data added to the cell header in the cell transmitted from the control portion.

According to the present invention, if the line interface is not separated into the individual units and the common unit, and when the additional processing portion separated from the basic processing unit is connected to the basic processing unit, the additional cell processing can be done.

Further, if the additional processing portion is not connected to the basic processing unit, a hardware quantity is reduced, and the services with respect to the cell processing can be thereby restricted. Moreover, if the line interface is separated into the individual units and the common unit, the services can be restricted based on the unit of the common unit.

Furthermore, if the several processing blocks provided in the additional processing unit are not connected to the basic processing unit, the services can be restricted by reducing a considerable quantity of the hardware.

Further, the selecting portion selects the connected processing blocks, and therefore the additional cell processes corresponding to the selected processing blocks can be performed.

If the UPC portion is not connected to the basic processing unit, the band width that should be employed by the subscriber of the subscriber's terminal is not managed, and the services permitting the use of all the band widths can be therefore offered. If the accounting portion is not connected, since the number of cells is not counted, it is possible to offer the services for which the fixed charge is imposed irrespective of a using quantity of the cells. If the VCI converting portion is not connected, the virtual channel identifier is not converted, and, hence, it is feasible to offer the UVP services in which contents of the path can be freely used as in the case of a private line.

Further, in the basic processing unit, the VPI converting portion carries out the basic process such as a process of converting the virtual path identifier into the output destination virtual path identifier.

Moreover, the additional executing portion is already connected to the basic processing unit, and, if the storage portion is connected to the basic processing unit, the additional process can be also executed by use of the data stored in the storage portion.

Additionally, the second processing portion executes the process on the cell while permitting the time lag but is provided with part of the basic processing unit and the additional executing portion. The second processing portion carried out the cell processing common to the part of the basic processing unit and the additional executing portion on the basis of the extracted header data and alarm transfer cell data. Hence, it is impossible to outwardly arrange only the part of the basic processing unit, the additional executing portion and a certain part of the cell processing portion. For this reason, only the storage portion is separated outside, and the additional cell processing can be executed.

Further, if the several storage blocks are not connected to the basic processing unit, the services can be restricted by decreasing the considerable quantity of the hardware.

Moreover, the header processing portion selects, when one or more storage blocks are connected, these connected storage blocks and is therefore capable of effecting the additional process by use of the data in the selected storage blocks.

Furthermore, the cell processing portion manages the alarm transfer cell by way of the basic cell processing. The cell processing portion manages the band width in use and performs the header conversion and the accounting process by way of the additional cell processing.

In addition, if the band management memory is not connected to the basic processing unit, it is possible to offer the services permitting the use of all the band widths. If the accounting memory is not connected, the fixed accounting services can be offered. If the virtual channel memory is not connected, the UVP services can be offered.

Furthermore, the cell processing portion determines whether or not the cell should be processed per line on the basis of the control data and the identification flag that are added to the cell header within the cell sent from the control portion in each individual unit, and hence the services can be restricted per line. Note that if the line interface is not separated into the individual units and the common unit, the cell services through the line can be restricted based on the control data.

Further, the cell processing portion determines whether or not the cell should be processed per virtual path identifier on the basis of the control data added to the cell header in the cell transmitted from the control portion within each individual unit. Therefore, the cell services can be restricted per virtual path identifier inputted to each line. Note that if the line interface is not separated into the individual units and the common unit, the cell services can be restricted per virtual path identifier through the line on the basis of the control data.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of a switching equipment according to the present invention will hereinafter be described.

<Embodiment 1>

Figure 1:
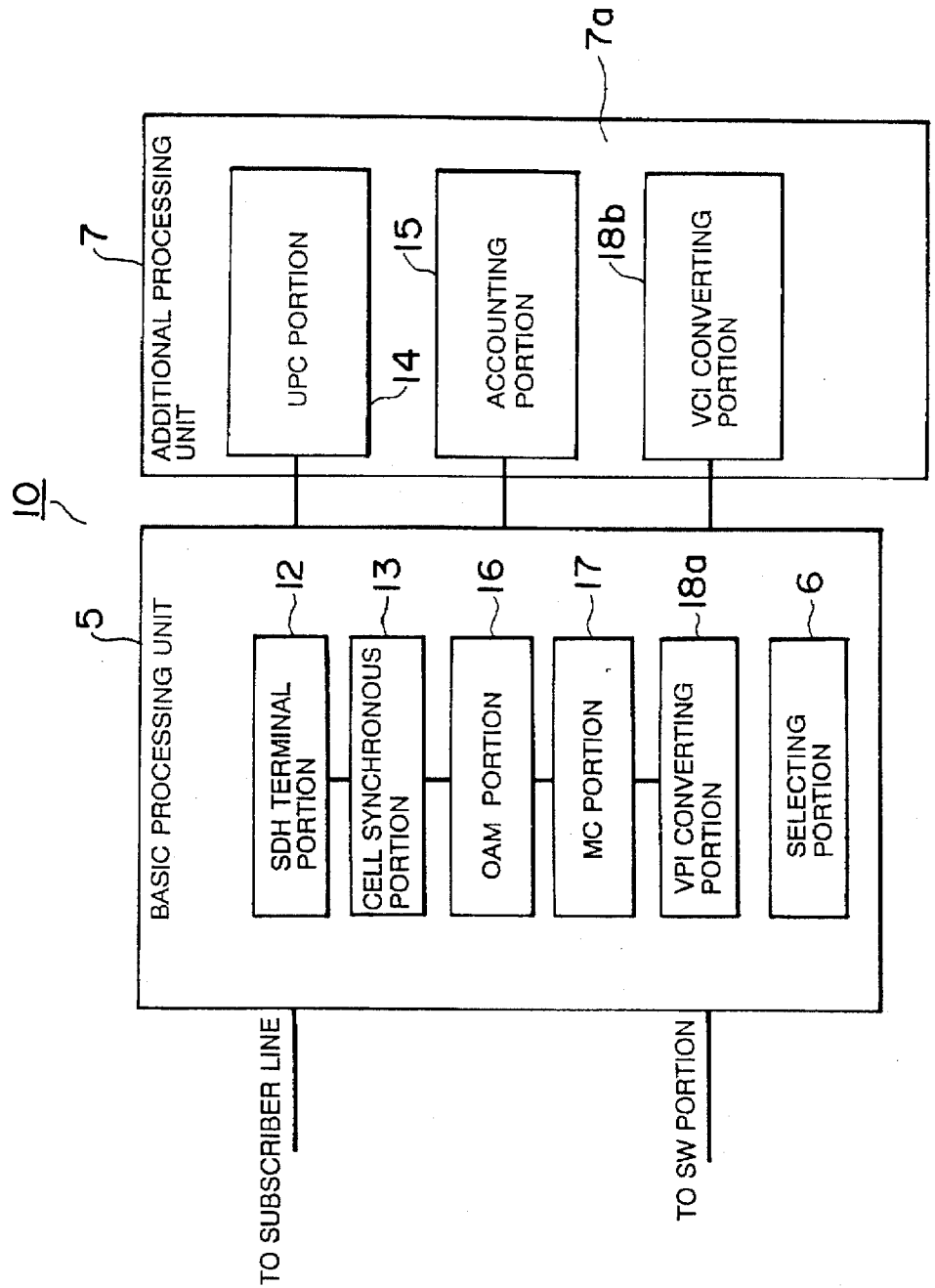
FIG. 1 is a block diagram illustrating a construction of a switching equipment in accordance with an embodiment 1 of the present invention.

To start with, an embodiment 1 of the present invention will be discussed. FIG. 1 is a block diagram illustrating a configuration of the switching equipment in accordance with the embodiment 1 of the present invention.

The switching equipment performs a switching process of a cell having a fixed length that is composed of data and a cell header. The switching equipment accommodates subscriber lines and includes a line interface 10 for processing the data from the subscriber line on a cell unit.

The line interface 10 includes a basic processing unit and an additional processing unit 7 connected to the basic processing unit 5. The basic processing unit 5 effects a basic processing with respect to the cell. The additional processing unit 7 is separated from the basic processing unit 5 but disconnectably connected to the basic processing unit 5 and performs additional processes with respect to the cell.

The basic processing unit 5 includes an SDH terminal portion 12, a cell synchronous portion 13, an OAM portion 16, and MC portion 17, a VPI converting portion 18a and a selecting portion 6.

The SDH terminal portion 12 terminates a transmission format of data transmitted via a line. The cell synchronous portion 13 connected to the SDH terminal portion 12 performs cell error control on the basis of header error control data written to a cell header contained in the cell and effects a cell synchronous detection.

The OAM portion 16 connected to the cell synchronous portion 13 manages an alarm transfer cell. The MC portion 17 connected to the OAM portion 16 measures at least one of a cell error characteristic, a cell loss characteristic and a cell delay characteristic by use of a management cell. The VPI/VCI converting portion 18a connected to the MC portion 17 converts a virtual path identifier written to the cell header contained in the cell into an output destination virtual path identifier.

Further, the selecting portion 6, when one or more processing blocks within the additional processing unit 7 are connected, selects the connected processing blocks and performs additional processes with respect to the cell.

The additional processing unit 7 includes a plurality of processing blocks for performing plurality of additional processes with respect to the cell. The respective processing blocks are individually disconnectably connected to the basic processing unit 5.

The additional processing unit 7 includes, as the plurality of processing blocks, a UPC (band management portion) 14, an accounting portion 15 and a VCI converting portion 18b.

The UPC portion 14 manages a band width which should be used by a subscriber of a subscriber's terminal by monitoring a flow quantity of cells. The accounting portion 15 collects pieces of accounting data by counting the number of cells. The VCI converting portion 18b converts the virtual channel identifier written to the cell header contained in the cell into an output destination virtual channel identifier.

According to the thus constructed line interface, in case the additional processing unit 7 disconnectable from the basic processing unit 5 is connected to the basic processing unit 5, the additional cell processing can be executed.

Further, in case the additional processing unit 7 is not connected to the basic processing unit 5, it is possible to reduce a quantity of hardware and restrict services for the cell processing. Moreover, if the several processing blocks 14, 15, 18a incorporated into the additional processing unit 7 are not connected to the basic processing unit 5, the services may be restricted by reducing a considerable quantity of hardware.

Furthermore, the selecting portion 6 selects the connected processing block, and, therefore, the additional cell processing corresponding to the selected processing block can be performed.

When the UPC portion 14 is not connected to the basic processing unit 5, the band width that should be used by the subscriber of the subscriber's terminal is not managed, and hence the services permitting the use of all the band widths can be offered. When the accounting portion 15 is not connected thereto, the number of cells is not counted, and it is therefore possible to offer the services for which a fixed charge is imposed irrespective of the cell using quantity. If the VCI converting portion 18b is not connected, since the virtual channel identifier is not converted, it is feasible to offer such a UVP service that a content of the path is freely usable as in the case of a private line.

Further, in the basic processing unit 5, the VPI converting portion 18a is capable of executing the basic process such as a process of converting the virtual path identifier into an output destination virtual path identifier.

<Embodiment 2>

Figure 2:
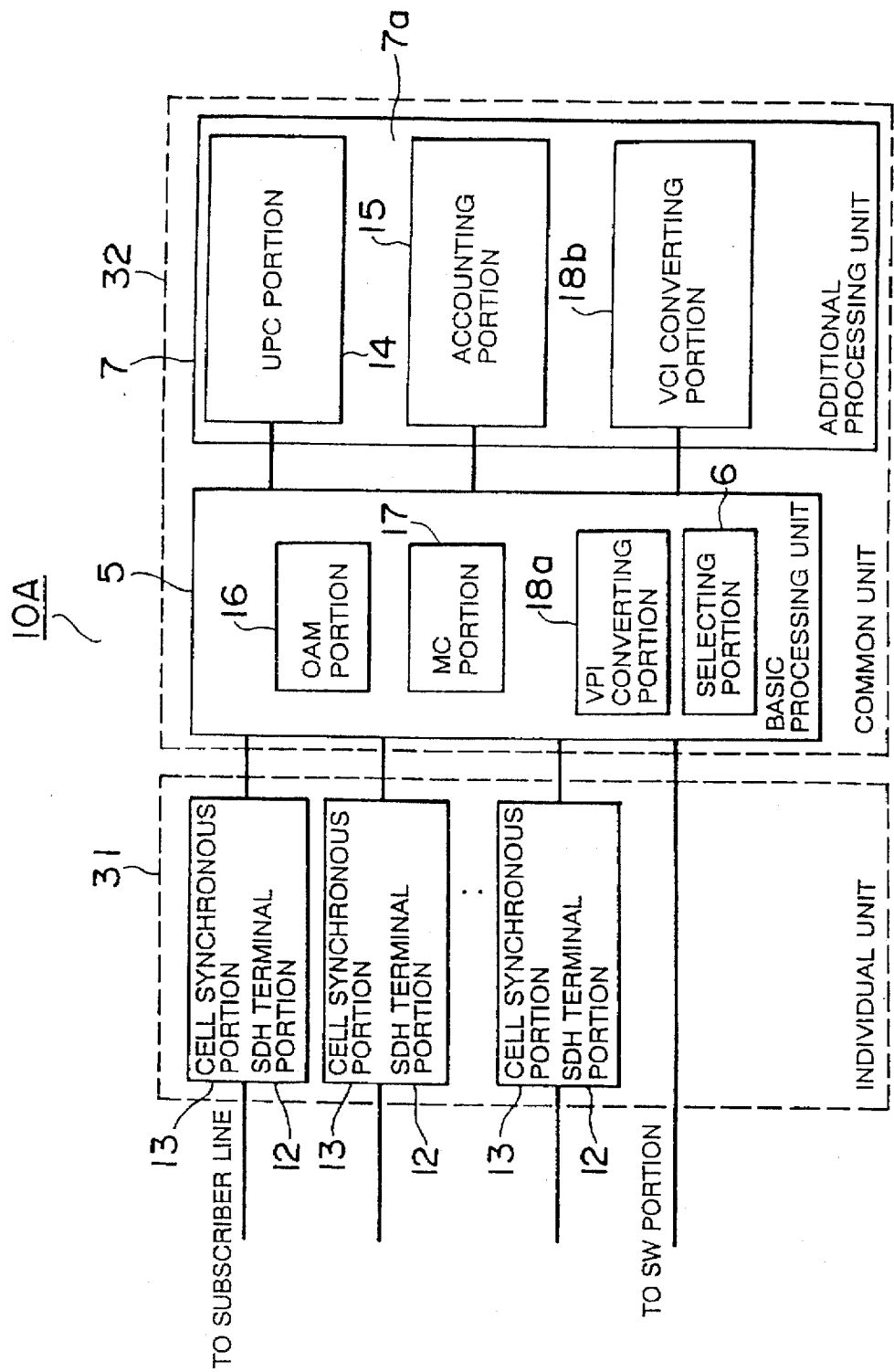
FIG. 2 is a block diagram illustrating a construction of the switching equipment in accordance with an embodiment 2 of the present invention.

Next, the switching equipment in an embodiment 2 of the present invention will be explained. FIG. 2 is a block diagram illustrating a configuration of the switching equipment in accordance with the embodiment 2. Referring to FIG. 2, the switching equipment performs the switching process of the cell having a fixed length that is composed of the data and the cell header.

The switching equipment accommodating a plurality of lines includes a line interface 10A for processing the data given from each line on the cell unit. The line interface 10A includes an individual unit 31 and a common unit 32.

The individual unit 31 is connected individually to each of the plurality of accommodated lines and individually performs the cell processing. The common unit 32 is connected to each individual unit 31 described above and batch-processes the cells processed by the individual unit 31.

The common unit 32 includes the basic processing unit 5 and the additional processing unit 7. The basic processing unit 5 executes the basic processes with respect to the cells. The additional processing unit 7 is separated from the basic processing unit 5 but disconnectable connected to the basic processing unit 5 and performs the additional processes with respect to the cells.

Each individual unit 31 includes the SDH terminal portion 12 and the cell synchronous portion 13. The SDH terminal portion 12 terminates the transmission format of data transmitted via the line. The cell synchronous portion 13 connected to the SDH terminal portion 12 performs the cell error control on the basis of the header error control data written to the cell header contained in the cell and effects the cell synchronous detection.

The basic processing unit 5 within the common unit 32 has the OAM portion 16, the MC portion 17 connected to the OAM portion 16, the VPI converting portion 18a and the selecting portion 6.

Further, the additional processing unit 7 includes the plurality of processing blocks for executing the plurality of additional processes with respect to the cells. The respective processing blocks are individually disconnectably connected to the basic processing unit 5.

The additional processing unit 7 includes the UPC 14, the accounting portion 15 and the VCI converting portion 18b which have been described in the embodiment 1. Note that the respective portions given above have already been explained in the embodiment 1, and hence the detailed discussion thereof will be omitted.

Thus, according to the embodiment 2, the line interface 10A is separated into the individual unit 31 and the common unit 32, and therefore the services can be restricted based on the unit of the common unit 32.

Further, if the several processing blocks incorporated into the additional processing unit 7 are not connected to the basic processing unit 5, the services can be restricted by reducing a considerable quantity of hardware.

Furthermore, the selecting portion 6 selects the connected processing block, and, therefore, the additional cell processing corresponding to the selected processing block can be carried out.

Incidentally, the effect when the UPC portion 7, the accounting portion 15 and the VCI converting portion 18b are not connected to the basic processing unit 5 is the same as that in the embodiment 1. In the basic processing unit 5, the VPI converting portion 18a is capable of effecting the basic process such as a process of converting the virtual path identifier into the output destination virtual path identifier.

<Embodiment 3>

Figure 3:
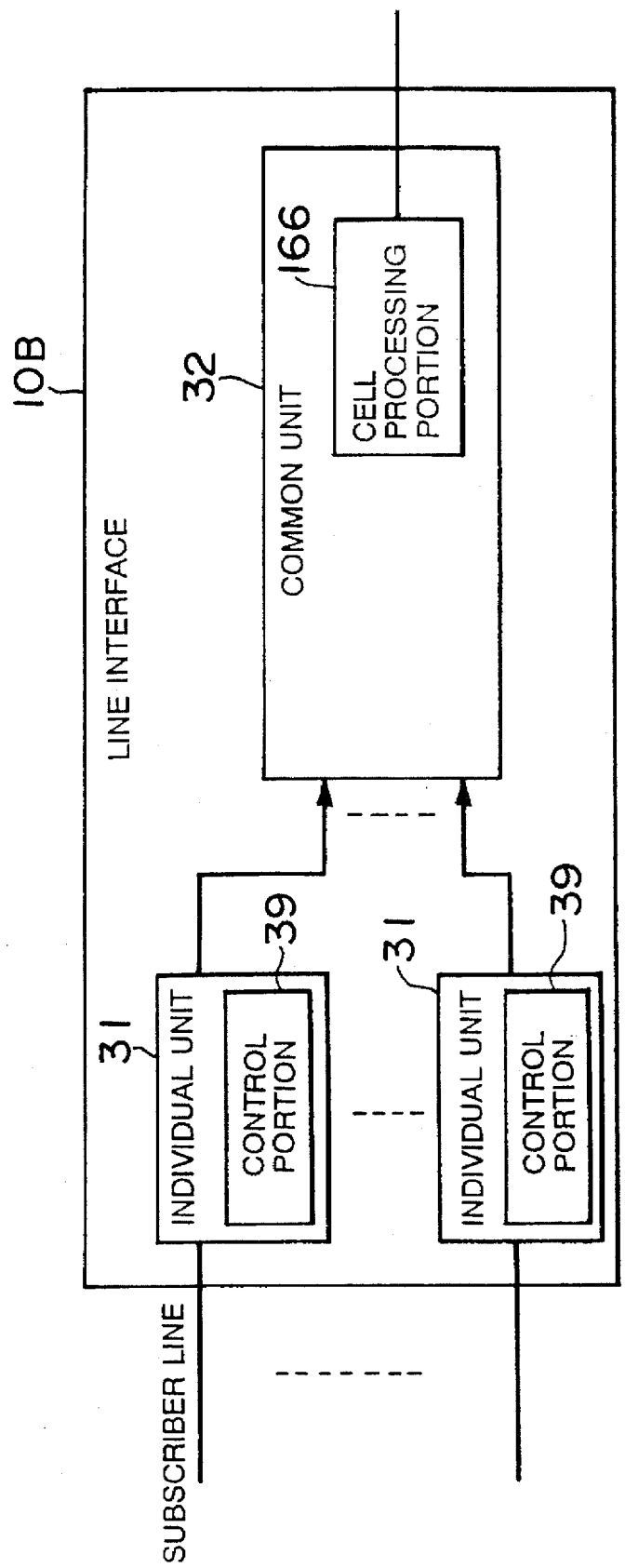
FIG. 3 is a block diagram illustrating a construction of the switching equipment in accordance with an embodiment 3 of the present invention.

Next, an embodiment 3 of the switching equipment of the present invention will be discussed. FIG. 3 is a block diagram illustrating a configuration of the switching equipment in accordance with the embodiment 3 of the present invention. The switching equipment performs the switching process of the cell having a fixed length that is composed of the data and the cell header. The switching equipment accommodating a plurality of lines includes a line interface 10B for processing the data given from each line on the cell unit. The line interface 10B includes the individual unit 31 and the common unit 32.

The individual unit 31 is connected individually to each of the plurality of accommodated lines and individually performs the cell processing. The common unit 32 is connected to each individual unit 31 described above and has a cell processing portion 166 for batch-processing the cells processed by the individual unit 31.

Each of the individual units 31 includes a control portion 39 for adding an identification flag for identifying a self individual unit to the cell header contained in the cell as well as adding an item of control data indicating whether or not the cell is to be processed per individual unit to the cell header contained therein.

The cell processing portion 166 determines whether or not the cell is to be processed per line on the basis of the control data and the identification flag that are added to the cell header within the cell transmitted from the control portion of each individual unit.

In accordance with the third embodiment 3 described above, the cell processing portion 166 determines whether or not the cell is to be processed per line on the basis of the control data and the identification flag that are added to the cell header within the cell transmitted from the control portion 39 within each individual unit, and hence the services can be restricted per line.

<Embodiment 4>

Figure 4:
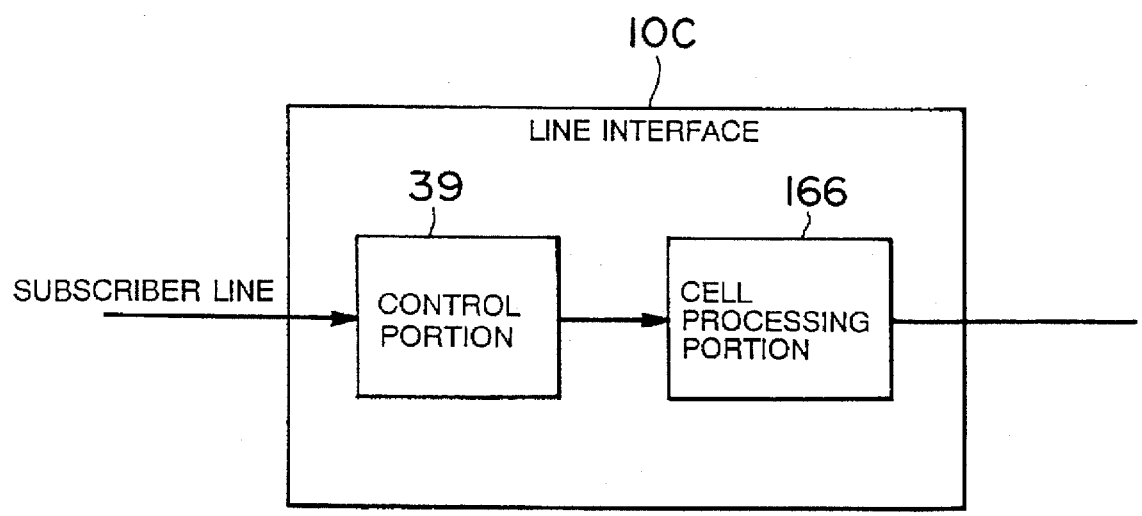
FIG. 4 is a block diagram illustrating a construction of the switching equipment in accordance with an embodiment 4 of the present invention.

Next, the switching equipment in accordance with an embodiment 4 of the present invention will be explained. FIG. 4 is a block diagram illustrating a configuration of the switching equipment in accordance with the embodiment 4. The switching equipment performs the switching process of the cell having a fixed length that is composed of the data and the cell header. The switching equipment accommodating the lines includes a line interface 10C for processing the data given from the line on the cell unit.

The line interface 10C includes the control portion 39 and the cell processing portion 166. Configurations of the control portion 39 and the cell processing portion 166 are the same as those in the embodiment 3.

Thus, according to the embodiment 4, the line interface 10C is not separated into the individual unit 31 and the common unit 32, and, therefore, the cell services through the line can be restricted based on the control data.

<Embodiment 5>

Figure 5:
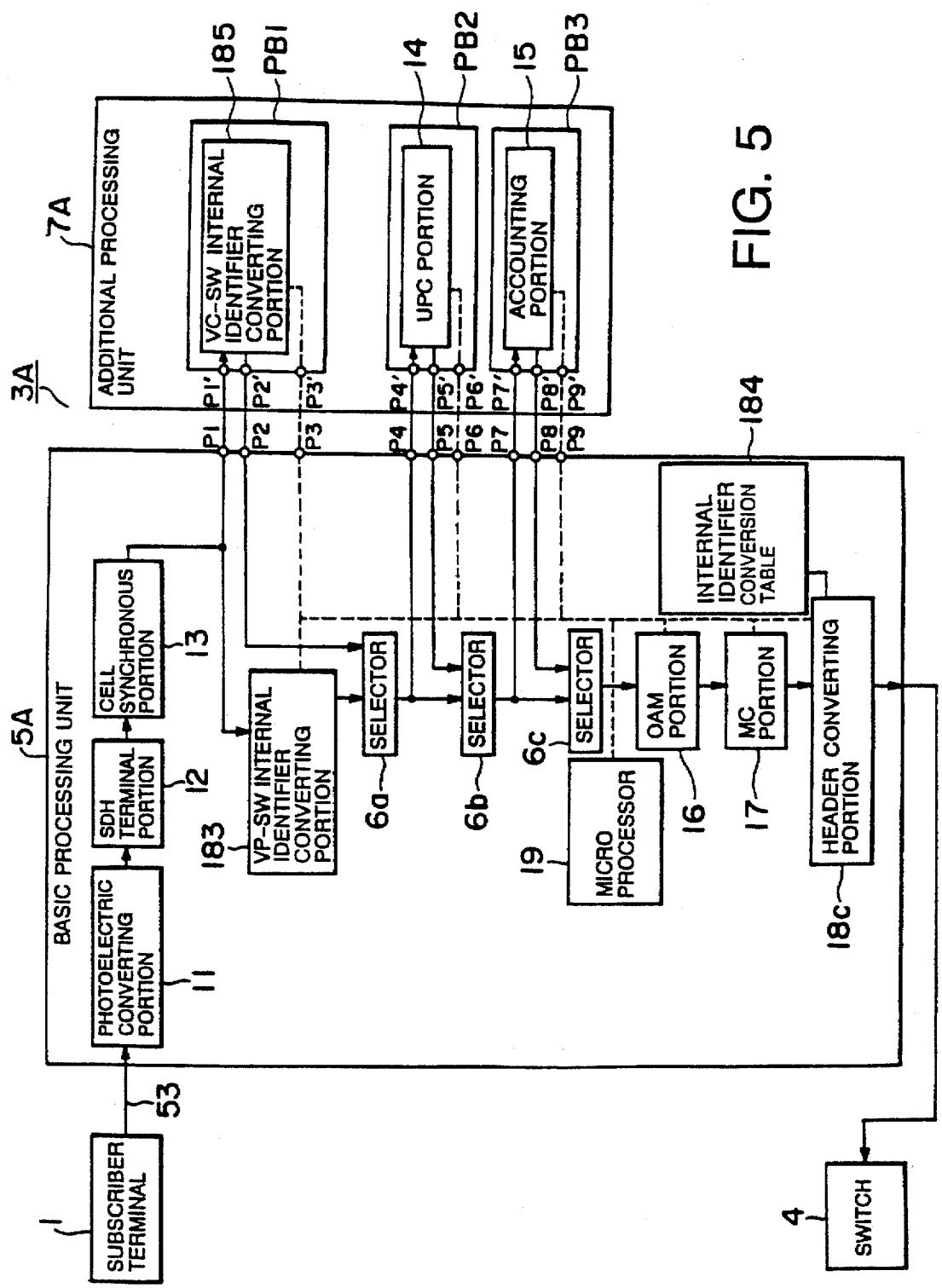
FIG. 5 is a block diagram showing a line interface within an ATM switching equipment in accordance with an embodiment 5 of the present invention.

FIG. 5 is a block diagram illustrating a configuration of the line interface within the ATM switching equipment in an embodiment 5. The embodiment 5 is more specific than the embodiment 1. A line interface 3A shown in FIG. 5 is provided between the subscriber's terminal 1 and a switch 4.

The line interface 3A is an interface for converting signals transmitted with a synchronous digital hierarchy (SDH) from the subscriber's terminal 1 into an ATM format and transmitting the signals to the switch 4. The switch 4 switches over an internal signal path in order to transmit the generated cells based on the ATM format to one of transit lines.

The line interface 3A is constructed of a basic processing unit 5A for performing the basic processes with respect to the cells and an additional processing unit 7A, is separated from the basic processing unit 5A but disconnectably connected to the basic processing unit 5A, for effecting the additional processes with respect to the cells.

The basic processing unit 5A includes the OE/EO converting portion 11, the SDH terminal portion 12 connected to the OE/EO converting portion 11, the cell synchronous portion 13 connected to the SDH terminal portion 12 and an internal identifier converting portion 183 for a VP-SW, which is connected to the cell synchronous portion 13.

The basic processing unit 5A includes a selector 6a connected to the VP-SW internal identifier converting portion 183, a selector 6b connected to the selector 6a and a selector 6c connected to the selector 6b. The basic processing unit 5A further includes the OAM portion 16 connected to the selector 6c, the MC portion 17 connected to the OAM portion 16, a header converting portion 18c connected to the MC portion 17 and a microprocessor 19.

Also, the additional processing unit 7A is constructed of printed boards PB1–PB3. The printed board PB1 is provided with a VC-SW internal identifier converting portion 185. The printed board PB2 is provided with the UPC portion 14, while the printed board PB3 is provided with the accounting portion 15.

When the printed board PB1 is disconnectably connected via terminals P1'–P3' to corresponding terminals P1–P3 of the basic processing unit 5A, the VC-SW internal identifier converting portion 185 is connectable to an internal identifier converting portion 183 for a VP-SW, the selector 6a and the microprocessor 19. The VP-SW internal identifier converting portion 183, when connected to the basic processing unit 5A, outputs a connection signal to the selector 6a.

When the printed board PB2 is disconnectably connected via terminals P4'–P6' to corresponding terminals P4–P6 of the basic processing unit 5A, the UPC portion 14 is connectable to the selectors 6a, 6b and the microprocessor 19. The UPC portion 14, when connected to the basic processing unit 5A, outputs a connection signal to the selector 6b.

When the printed board PB3 is disconnectably connected via terminals P7'–P9' to corresponding terminals P7–P9 of the basic processing unit 5A, the accounting portion 15 is connectable to the selectors 6b, 6c and the microprocessor 19. The accounting portion 15, when connected to the basic processing unit 5A, outputs a connection signal to the selector 6c.

The OE/EO converting portion 11 converts the photo signal from the subscriber line 53 composed of the optical cable into the electric signal or reversely converts the electric signal into the photo signal. The SDH terminal portion 12 terminates the SDH format transmitted from the subscriber's terminal 1.

The cell synchronous portion 13 effects the cell error control on the basis of the header error control data written to the cell header and carries out the cell synchronous detection.

The UPC portion 14 manages the band width which should be used by the subscriber by monitoring a traffic density. The accounting portion 15 collects the accounting data by counting the number of cells inputted. The OAM portion 16 manages the alarm transfer management cell. The MC portion 17 monitors a cell quality by measuring the cell error characteristic, the cell loss characteristic and the cell delay characteristic by use of an MC cell.

The selector 6a selects, when the printed board PB1 is connected to the basic processing unit 5A, the VC-SW internal identifier converting portion 185 on the basis of the connection signal transmitted from the printed board PB1. The selector 6b selects, when the printed board PB2 is connected to the basic processing unit 5A, the UPC portion 14 on the basis of the connection signal transmitted from the printed board PB2. The selector 6c selects, when the printed board PB3 is connected to the basic processing unit 5A, the accounting portion 15 on the basis of the connection signal transmitted from the printed board PB3.

The microprocessor 19 controls the VP-SW internal identifier converting portion 183, the VC-SW internal identifier converting portion 185, the UPC portion 14, the accounting portion 15, the OAM portion 16, the MC portion 17 and the VPI converting portion 18a.

Figure 6:
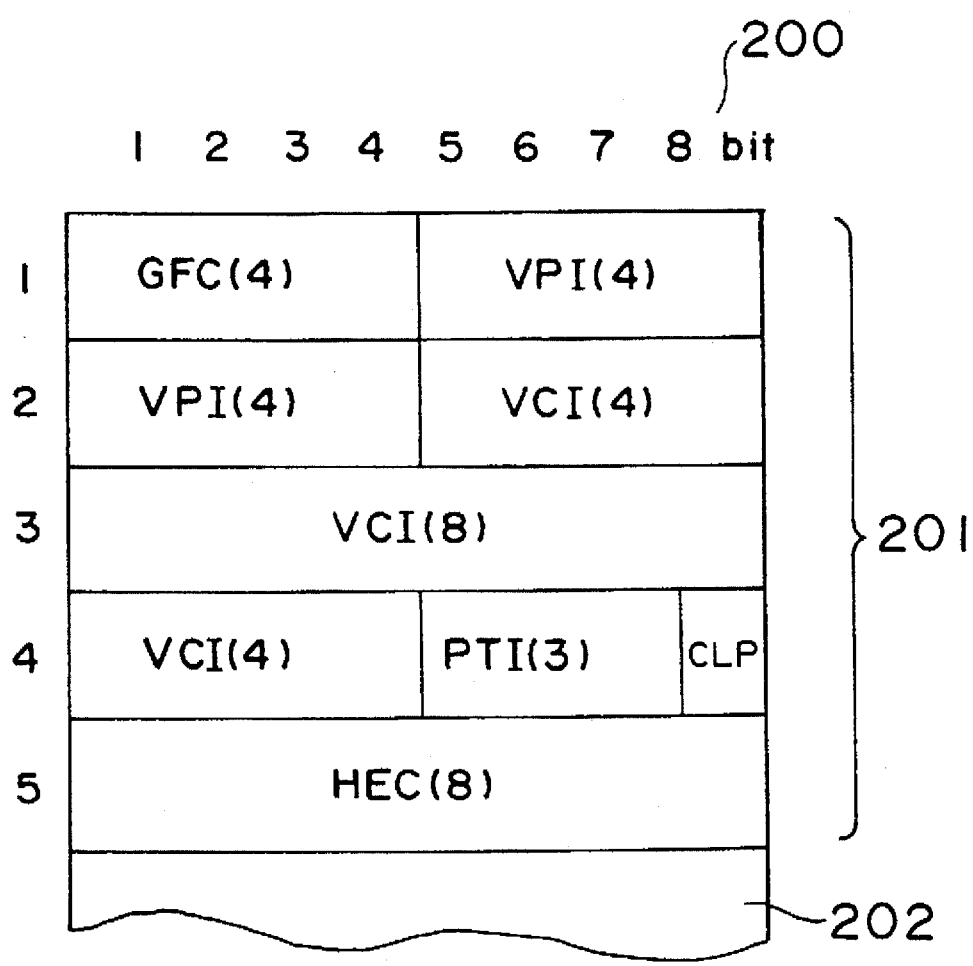
FIG. 6 is a diagram showing a cell format in an ATM in the embodiment 5.

FIG. 6 shows a cell format in the ATM. The cell is composed of a 5-byte header and a 48-byte data field. A cell 200 shown in FIG. 6 is composed of a header 201 and data field 202.

The header 201 consists of a piece of 4-bit flow control data (GFC; Generic Flow Control), an 8-bit VPI, 12-bit VCI, a piece of 3-bit cell format data (PTI; Payload Type Identifier), a piece of cell disposal priority data (CLP; Cell Loss Priority) and a piece of 8-bit header control data (HEC; Header Error Control).

Figure 7:
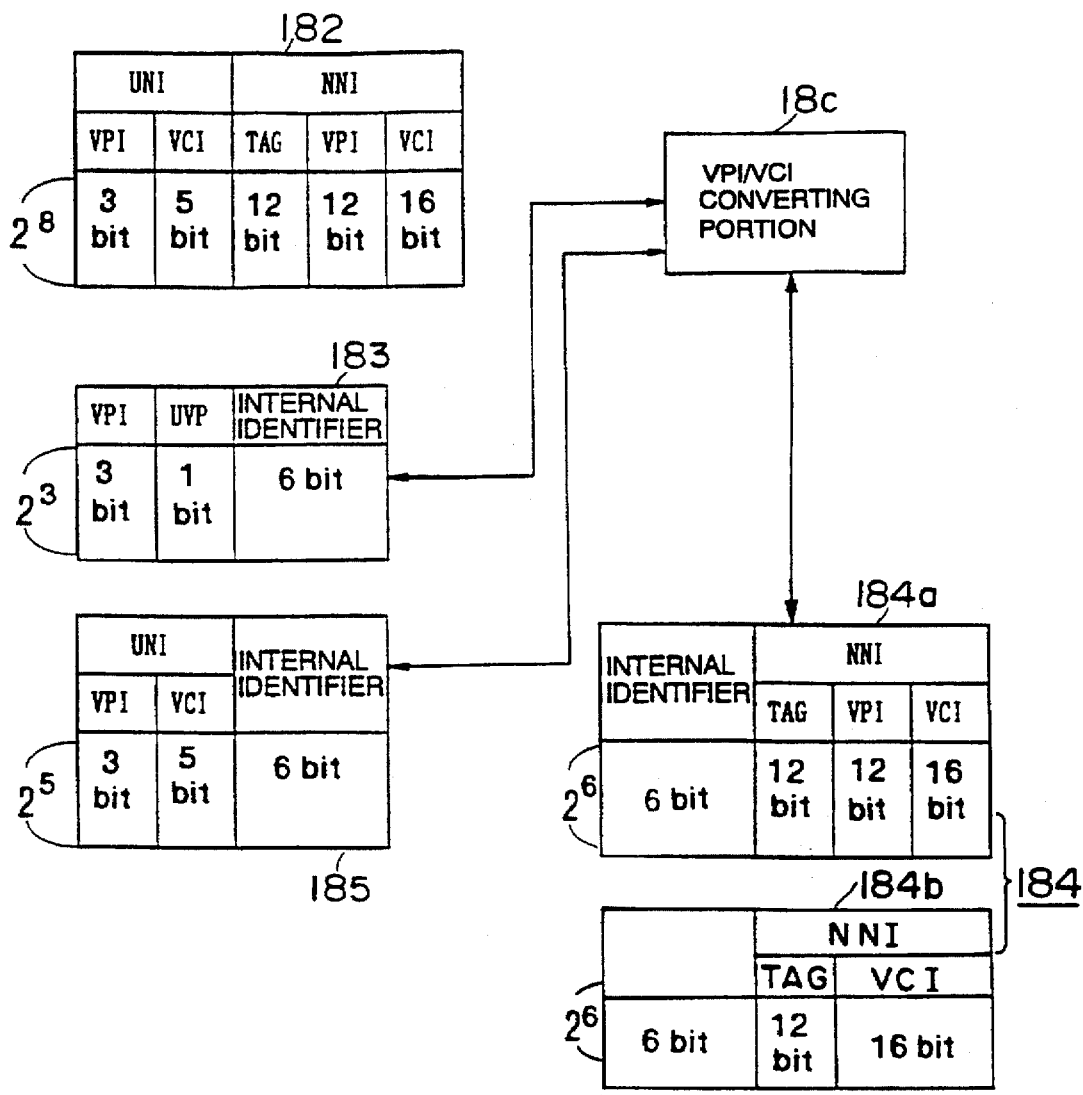
FIG. 7 is a diagram showing a VPI/VCI conversion by use of an internal identifier in the embodiment 5.

FIG. 7 illustrates a VPI/VCI conversion by use of the internal identifier. Referring to FIG. 7, a header converting portion 18c, a VPI/VCI conversion table 182 before being reduced, the VP-SW internal identifier converting portion 183, the VC-SW internal identifier converting portion 185 and an internal identifier conversion table 184 (184a, 184b) are provided.

In the VPI/VCI conversion table 182, tag data (TAG) and an output destination VPI (network node interface; NNI) are allocated to the VPI (user node interface; UNI) inputted.

Referring again to FIG. 7, the VPI/VCI of the VPI/VCI conversion table 182 is reduced by use of the internal identifier. In the VPI/VCI conversion table 182, the VPI of the UNI is set to 3 bits; the VCI thereof is set to 5 bits; the VPI of the NNI is set to 12 bits; and the VCI thereof is set to 16 bits. The TAG is set to 12 bits.

The VP-SW internal identifier converting portion 183 converts a 3-bit VPI and a 1-bit UVP (data indicating whether or not only UVP services are conducted without effecting the VC conversion) into a 6-bit internal identifier. The VC-SW internal identifier converting portion 185 converts a 5-bit VCI into the 6-bit internal identifier.

The header converting portion 18c converts the internal identifier converted by the VP-SW internal identifier converting portion 183 into the output destination VPI in accordance with the internal identifier conversion table 184a.

The header converting portion 18c converts the internal identifier converted by the VC-SW internal identifier converting portion 185 into the output destination VCI in accordance with the internal identifier conversion table 184b.

A memory quantity is reduced by restricting the number of all the VCIs simultaneously using the plurality of VPs by use of the above-described internal identifier.

Figure 8:
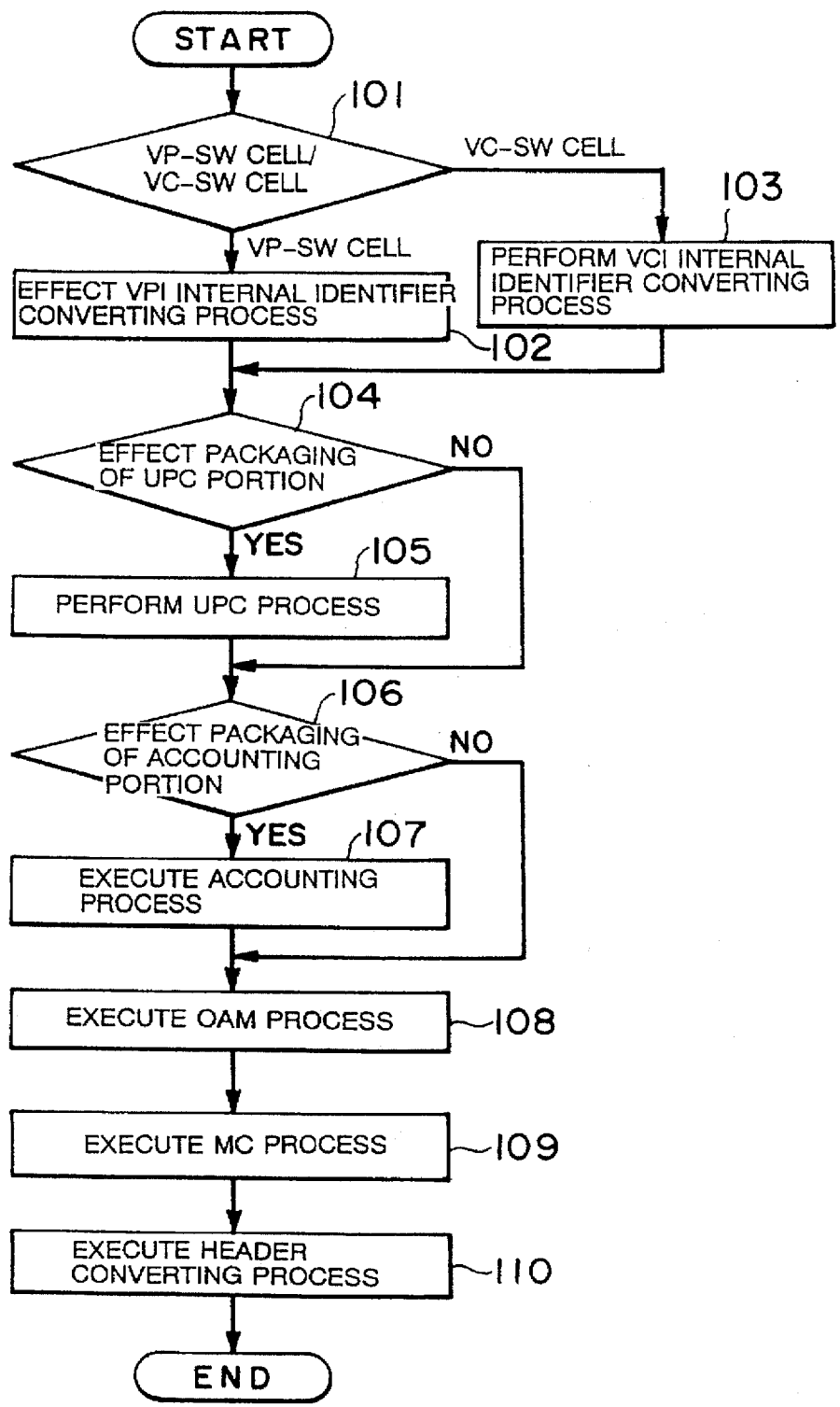
FIG. 8 is a flowchart showing operations of the line interface in the embodiment 5.

Next, the operation of the line interface in the thus constructed embodiment 5 will be explained. FIG. 8 is a flowchart showing the operation of the line interface in the embodiment 5. At first, the selector 6a determines whether or not the VC-SW internal identifier converting portion 185 is connected to the basic processing unit 5A by a connection signal given from the printed board PB1 (step 101).

Herein, if the VC-SW internal identifier converting portion 185 is not connected to the basic processing unit 5A, the selector 6a selects the VP-SW internal identifier converting portion 183, and, therefore, the VP-SW internal identifier converting portion 183 performs an internal identifier converting process (step 102). That is, as illustrated in FIG. 7, the VPI and UVP are converted into the internal identifier.

Whereas if the VC-SW internal identifier converting portion 185 is connected to the basic processing unit 5A, the selector 6a selects the VC-SW internal identifier converting portion 185, and hence the VC-SW internal identifier converting portion 185 carries out the internal identifier converting process (step 103). That is, as shown in FIG. 7, the VCI is converted into the internal identifier.

Next, the selector 6b determines whether or not the UPC portion 14 is connected to the basic processing unit 5A from the connection signal given from the printed board PB2 (step 104).

Herein, if the UPC portion 14 is not connected to the basic processing unit 5A, the operation proceeds to a process of step 106 without performing the process of the UPC. In this case, the services permitting all the band widths can be offered by reducing the hardware quantity.

Whereas if the UPC portion 14 is connected to the basic processing unit 5A, the selector 6b selects the UPC portion 14, and hence the UPC portion 14 carries out the UPC process (step 105). That is, the user's band width is managed.

Next, the selector 6c determines whether or not the accounting portion 15 is connected to the basic processing unit 5A by the connection signal given from the printed board PB3 (step 106).

Herein, if the accounting portion 15 is not connected to the basic processing unit 5A, the operation proceeds to a process of step 108 without performing the accounting process. In this instance, the services for which a fixed charge is imposed without depending on a cell using quantity can be offered by reducing the hardware quantity.

Whereas if the accounting portion 15 is connected to the basic processing unit 5A, the selector 6c selects the accounting portion 15, and therefore the accounting portion 15 effects the accounting process (step 107), That is, the charge is imposed corresponding to the count number of cells.

Further, the OAM portion 16 performs an OAM process with respect to the cell (step 108). The MC portion 17 effects an MC process on the cell (step 109).

Next, the header converting portion 18c executes a header converting process with reference to the internal identifier conversion table 184 (step 110). Herein, if the VC-SW internal identifier converting portion 185 is not connected to the basic processing unit 5A, the header converting portion 18c converts the internal identifier converted by the VP-SW internal identifier converting portion 183 into the output destination VPI by use of the internal identifier conversion table 184a.

That is, in this case, the UVP services by which contents of the path can be freely usable as in the case of the private line can be actualized by reducing the hardware quantity.

Whereas if the VC-SW internal identifier converting portion 185 is connected to the basic processing unit 5A, the header converting portion 18c converts the internal identifier converted by the VC-SW internal identifier converting portion 185 into the output destination VCI by use of the internal identifier conversion table 184b.

Note that the UPC portion 14, the accounting portion 15, the VC-SW internal identifier converting portion 185 are individually connectable to the basic processing unit 5A.

<Embodiment 6>

Figure 9:
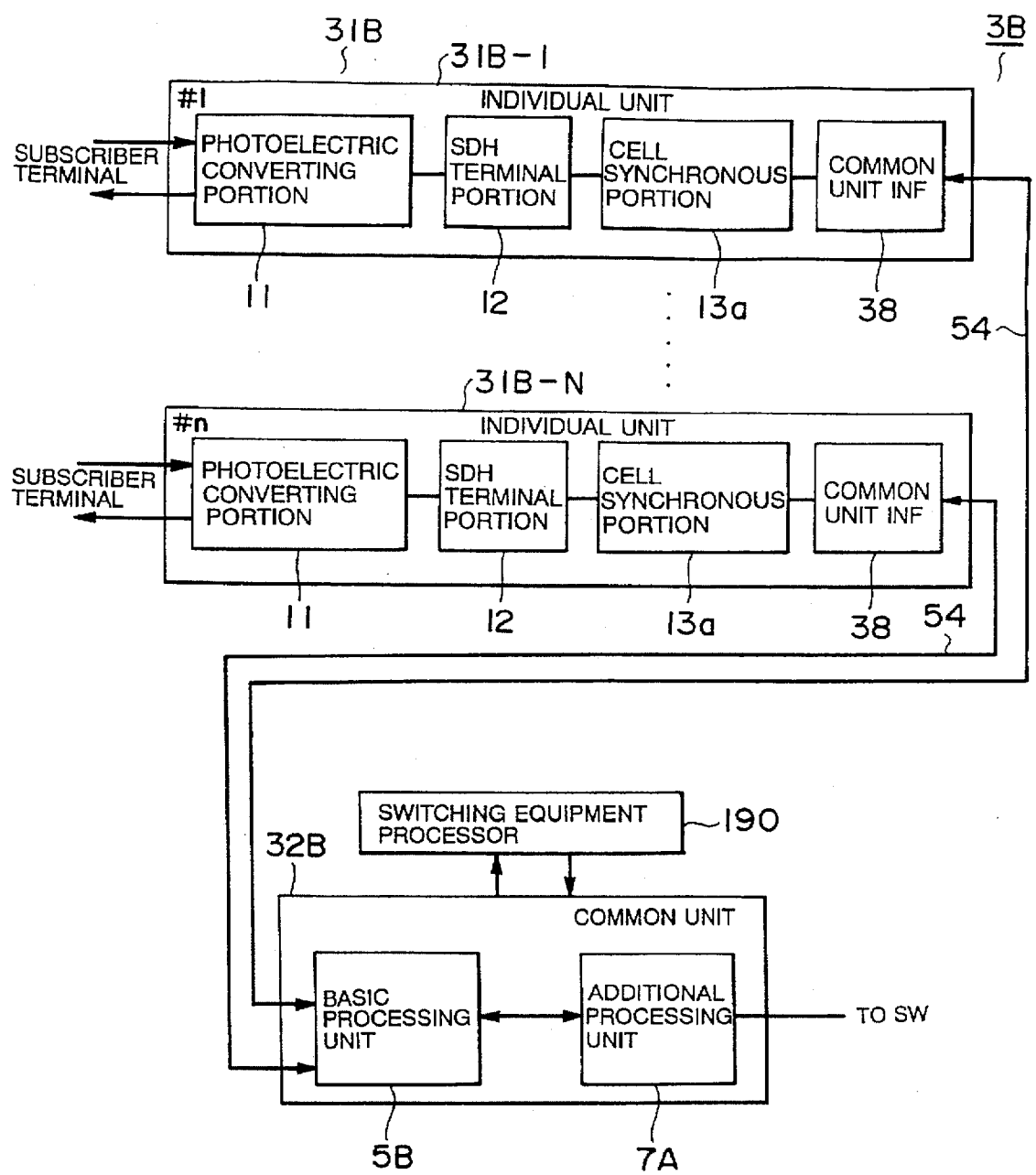
FIG. 9 is a diagram illustrating a construction of the ATM switching equipment in accordance with an embodiment 6 of the present invention.

Next, an embodiment 6 of the present invention will be discussed. The embodiment 6 is more specific than the embodiment 2. FIG. 9 illustrates a configuration of the line interface in the embodiment 6 of the present invention.

A line interface 3B in the embodiment 6 includes individual units 31B and one common unit 32B.

Each of the individual units 31B (31B-1 through 31B-N) is individually connected to each of the plurality of subscriber's terminals 1 via the subscriber line and individually performs the cell processing. The common unit 32B is connected to all these individual units and batch-processes the cell processed by each individual unit 31B.

Each of the individual units 31B-1 through 31B-N processes the data transmitted from the subscriber's terminal 1 on the cell unit and transfers the data to the common unit 32B. Each of the individual units 31B-1 through 31B-N is constructed of the OE/EO converting portion 11, the SDH terminal portion 12 connected to the OE/EO converting portion 11, the cell synchronous portion 13a connected to the SDH terminal portion 12, a common interface (INF) 38 connected to the cell synchronous portion 13a and the common unit 32B. The common interface INF 38 transfers the cell data via a signal line 54 to the common unit 32B.

Note that the OE/EO converting portion 11 and the SDH terminal portion 12 have already been explained, and therefore their explanations will be herein omitted. The cell synchronous portion 13a effects the cell synchronous detection and adds an identification flag for identifying a self individual unit to the cell header of the cell.

The common unit 32B transfers the cells from the plurality of individual units 31B-1 through 31B-N to the switch 4. The common unit 32B includes the basic processing unit 5B and the additional processing unit 7A disconnectably connected to the basic processing unit 5B.

Figure 10:
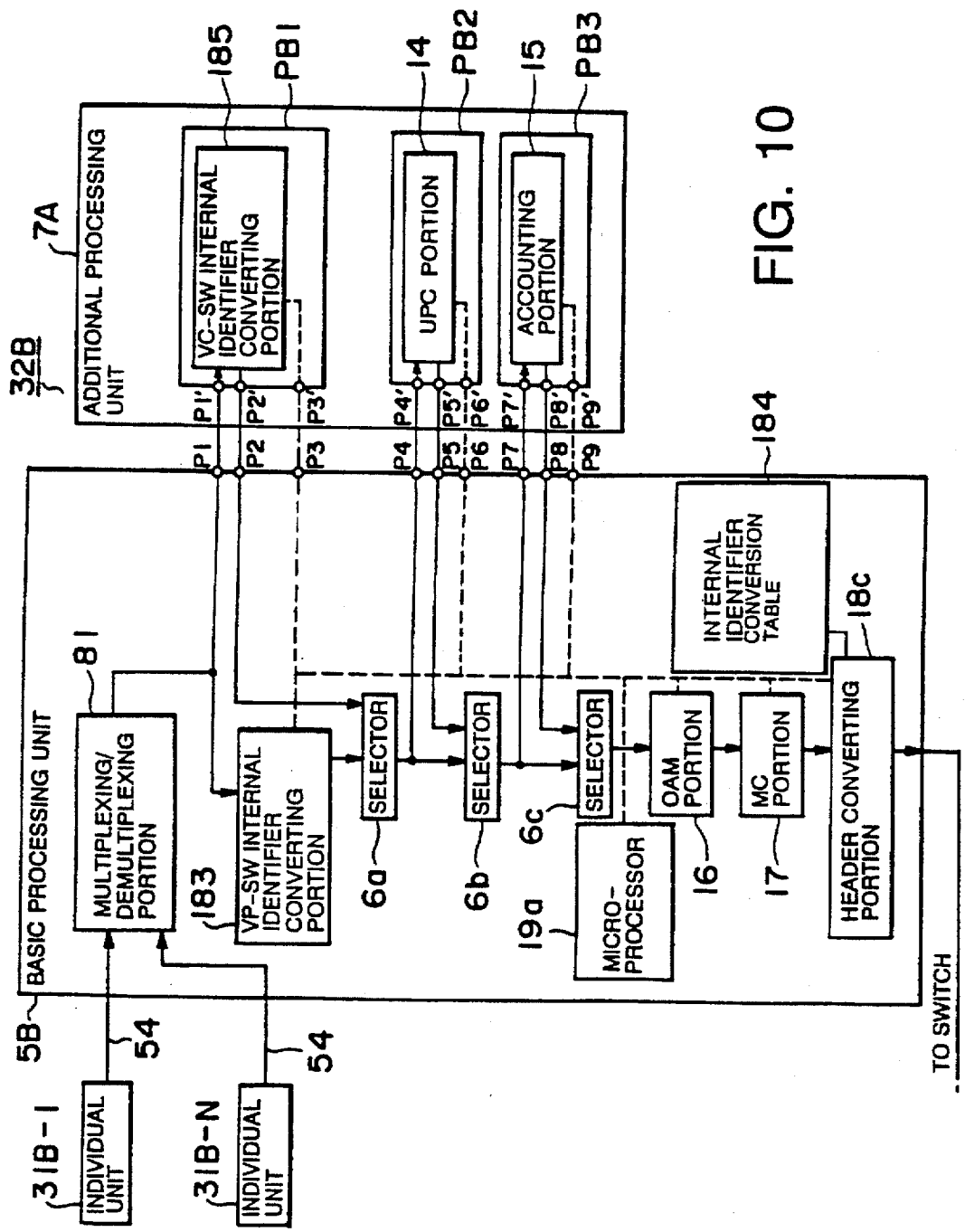
FIG. 10 is a diagram showing a construction of a common unit in the embodiment 6.

FIG. 10 illustrates a configuration of the common unit in the embodiment 6. As shown in FIG. 10, the basic processing unit 5B includes a multiplexing/demultiplexing portion 81 connected to each individual unit and also to the VP-SW internal identifier converting portion 183, the selectors 6a–6c, the OAM portion 16, the MC portion 17, the header converting portion 18c and the microprocessor 19a. Note that the configurations of the selectors 6a–6c, the OAM portion 16, the MC portion 17 and the header converting portion 18c are the same as those in the embodiment 5, and hence their explanations will be herein omitted.

The multiplexing/demultiplexing portion 81 multiplexes the cell transmitted from each of the individual units 31B-1 to 31B-N or demultiplexes the cell with respect to each individual unit 31. The microprocessor 19a controls the multiplexing/demultiplexing portion 81 and other respective portions.

A switching equipment processor 190 notifies the respective individual units 31B-1 to 31B-N of trouble monitoring commands for monitoring troubles in the individual units 31B-1 through 31B-N as well as of control commands for controlling the individual units 31B-1 through 31B-N. The switching equipment processor 190 is connected to the microprocessor 19a.

The description given above has dealt with the cell transfer from the subscriber's terminal 1 via the line interface 3B to the switch 4. Reversely to this order, however, the cell can be transferred from the switch 4 via the line interface 3B to the subscriber's terminal 1.

Note that the additional processing unit 7A has already been explained in the embodiment 5, and, hence, the explanation thereof will be herein omitted.

According to the above construction, the respective cells processed in the individual units 31B-1 through 31B-N are batch-processed by the basic processing unit 5B incorporated into the common unit 32B. The basic processing unit 5B identifies each cell on the basis of the identification flag added to the cell header in order to distinguish the cells of the respective individual units. That is, the OAM portion 16, the MC portion 17 and the header converting portion 18c within the basic processing unit 5B are commonized to the individual units 31B-1 through 31B-N, and consequently the downsizing of the line interface 3B can be attained.

Further, the UPC portion 14, the accounting portion 15, the VC-SW internal identifier converting portion 185 within the additional processing unit 7A can be connected to the basic processing unit 5A, and, therefore, the same effects as those in the embodiment 5 can be obtained.

Moreover, if the line interface is separated into the individual units and the common unit, the services can be offered based on the unit of the common unit.

<Embodiment 7>

Figure 11:
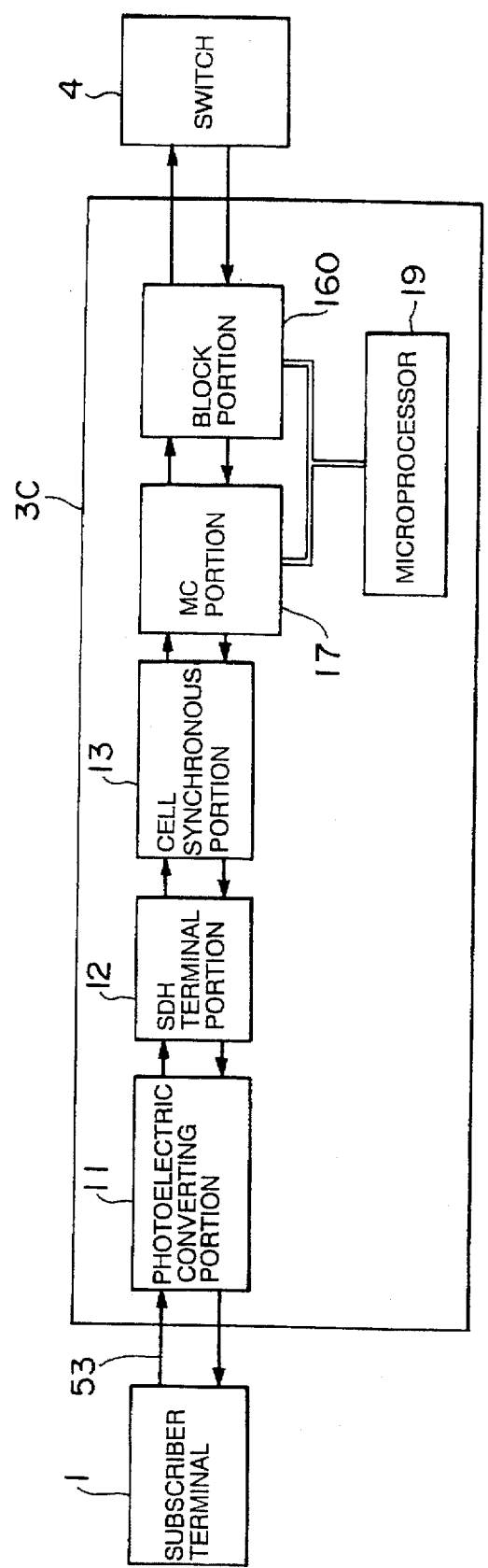
FIG. 11 is a diagram illustrating the line interface of the ATM switching equipment in accordance with an embodiment 7 of the present invention.

Next, an embodiment 7 of the present invention will be discussed. FIG. 11 illustrates the line interface in the embodiment 7. In accordance with the embodiment 7, there will be explained an example where a line interface 3C is provided corresponding to the subscriber's line.

One subscriber's terminal 1 is connected via the subscriber's line 53 to the line interface 3C. The line interface 3C is constructed such that switch 4 is connected to an output of the line interface 3C. That is, this line interface 3C is provided corresponding to one subscriber's terminal 1.

Herein, the line interface 3C has such a characteristic that the line interface 3C is separated into a processing unit for processing the cell in real time and a processing unit for processing the cell so as to allow a time lag, and a storage portion defined as part of the additional processing unit is separated outside.

The line interface 3C includes the OE/EO converting portion 11, the SDH terminal portion 12, the cell synchronous portion 13, the MC portion 17, a block portion 160, a storage portion 170 and a microprocessor 19c. The microprocessor 19c controls the MC portion 17 and the block portion 160.

The MC portion 17 monitors the cell quality by measuring the cell error characteristic, the cell loss characteristic and the cell delay characteristic by use of the MC cell. For this purpose, the MC portion 17 is required to make coincident extraction/insertion timings of the MC cell. That is, the MC cell is processed in real time.

The block portion 160 blocks the processes that are allowed even if there is a deviation between the extraction/insertion timings of the OAM cell and the header data.

The block portion 160 blocks, e.g., the UPC portion 14, the accounting portion 15, the OAM portion 16 and the header converting portion 18.

Figure 12:
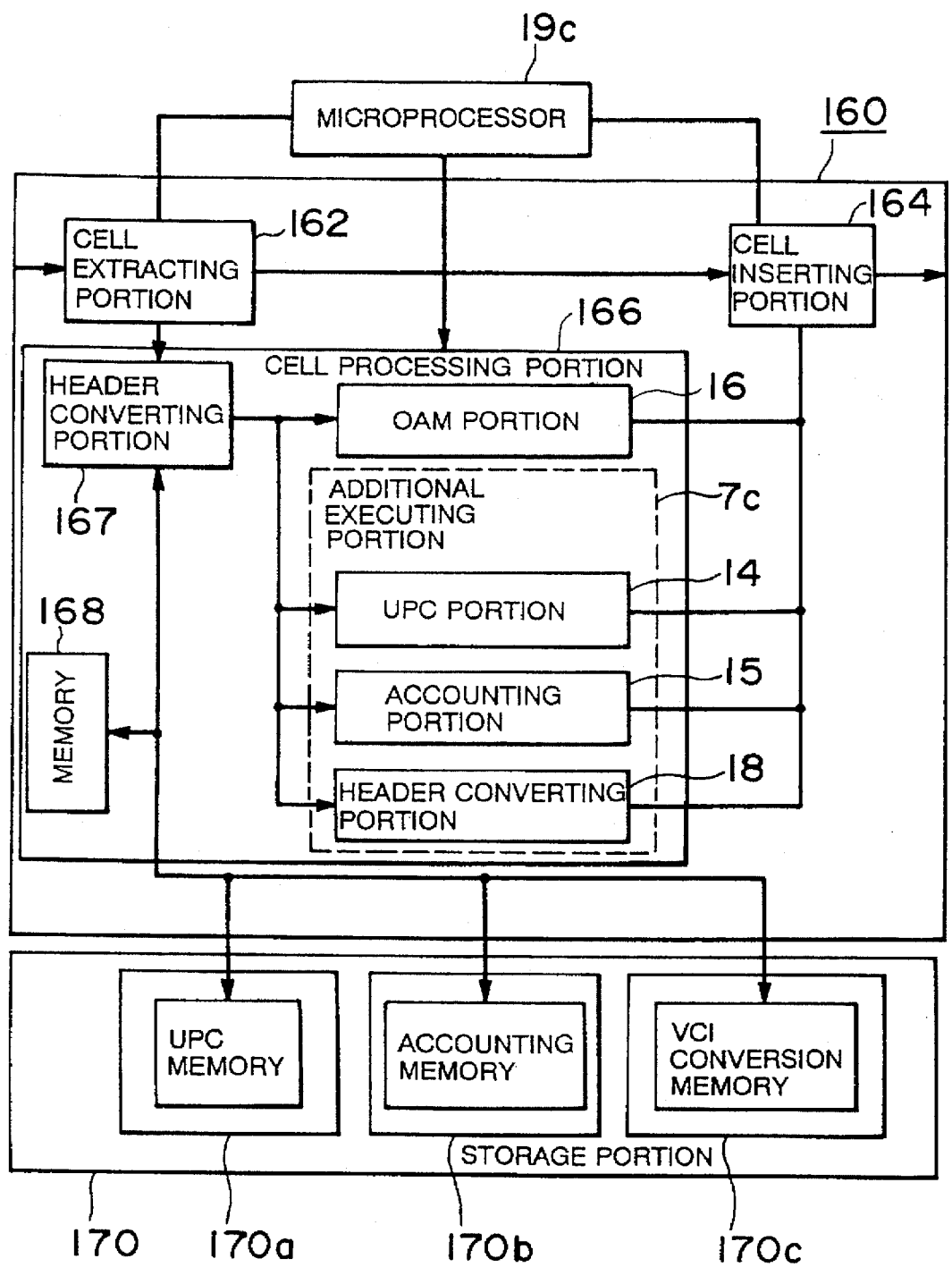
FIG. 12 is a diagram illustrating specific constructions of a block portion and a storage portion in the embodiment 7.

FIG. 12 illustrates specific configurations of the block portion and the storage portion. The block portion 160 includes a cell extracting portion 162, a cell inserting portion 164 and a cell processing portion 166. The cell extracting portion 162 extracts the header data and a preset item of specified OAM cell data from the cells inputted and outputs these items of data to the cell processing portion 166.

The cell processing portion 166 is constructed of the OAM portion 16 defined as part of the basic processing unit explained in the embodiment 5, an additional executing portion 7c already connected to the interior of the basic processing unit, a header processing portion 167 and a memory 168. The additional executing portion 7c comprises the UPC portion 14, the accounting portion 15 and the header converting portion 18. The construction is that the respective portions of the additional executing portion 7c and the OAM portion 16 within the cell processing unit 166 employ the cell extracting portion 162 and the cell inserting portion 164 in common.

On the other hand, the storage portion 170 is disconnectably connected to the block portion 160. The storage portion 170 is constructed of a UPC memory 170a for storing necessary items of data for the processing of the UPC portion 14, an accounting memory 170b for storing necessary items of data for the processing of the accounting portion 15 and a VCI conversion memory 170c for storing necessary items of data for the VCI conversion processing. These memories are individually connected to the block portion 160. The memory 168 stores a various items of data.

The UPC portion 14 inputs the header data extracted by the cell extracting portion 162 and determines whether or not an inflow of the cells is permitted based on this item of header data. If the cell inflow is not permitted, the UPC portion 14 gives an indication to dispose of the cells to the cell inserting portion 164.

The accounting portion 15 inputs the header data extracted by the cell extracting portion 162 and counts the number of cells on the basis of this item of header data, thereby collecting the accounting data.

The header converting portion 18 inputs the header data extracted by the cell extracting portion 162, converts this item of header data into a new item of header data and outputs the thus converted header data to the cell inserting portion 164.

The OAM portion 16 inputs an item of OAM cell data extracted by the cell extracting portion 162 and effects a cell receiving process and a creation of the OAM cell on the basis of the OAM cell data.

The cell inserting portion 164 disposes of the cells in accordance with a cell disposal indication sent from the UPC portion 14 within the cell processing portion 166. The cell inserting portion 164 re-adds the new header data to the cell header in accordance with the new header data sent from the header converting portion 18 within the cell processing portion 166. The cell inserting portion 164 inserts the OAM cell in accordance with the OAM cell data sent from the OAM portion 16 within the cell processing portion 166.

The header converting portion 167 processes the cells on the basis of the extracted header data and OAM cell data and checks whether or not each of the portions within the storage portion 170 is connected to the block portion 160.

Figure 13:
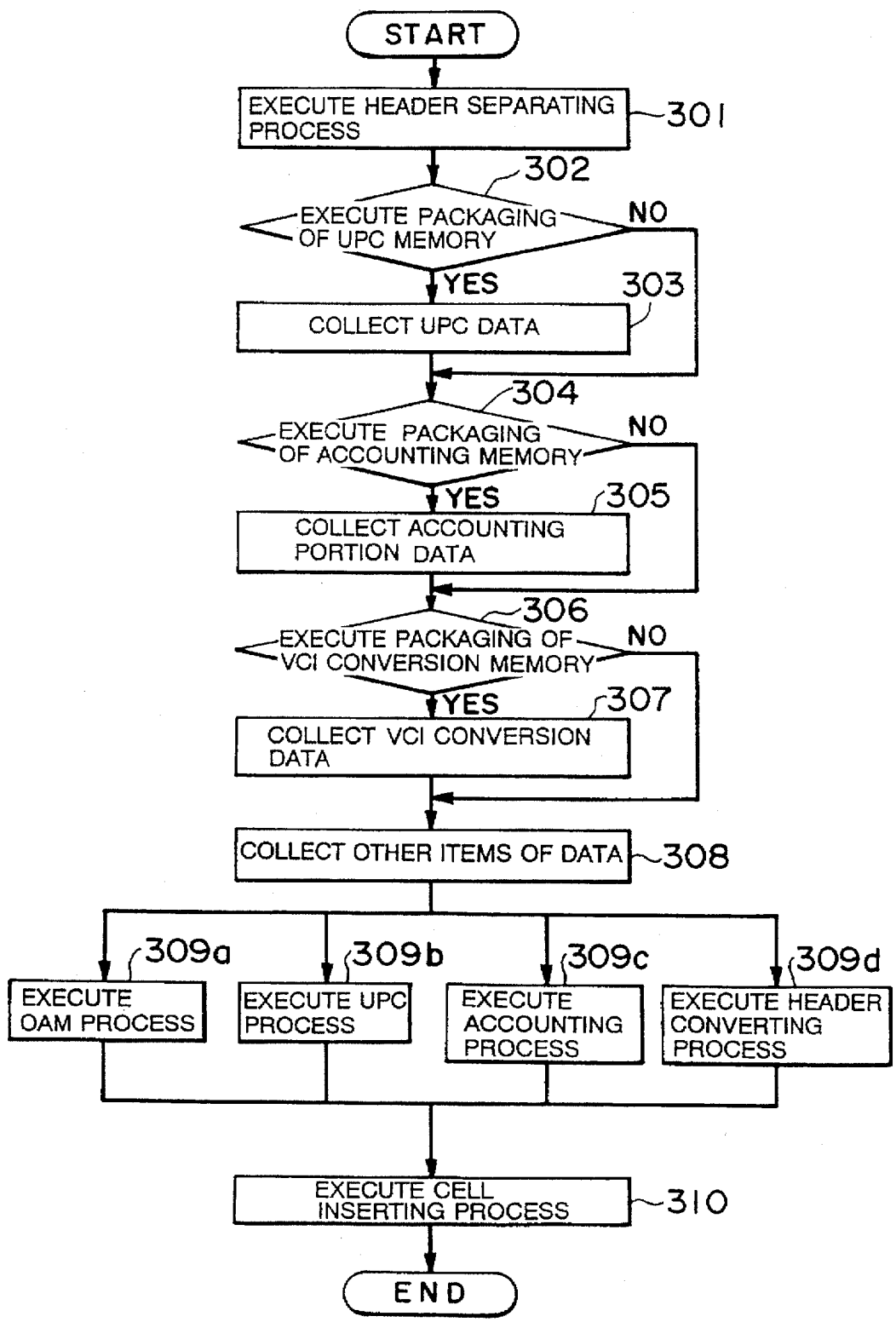
FIG. 13 is a flowchart showing operations of the interface in the embodiment 7.

Next, the operations of the thus constructed embodiment 3 will be described with reference to FIG. 13. Referring to FIG. 13, the operations of the block portion 160 and the storage portion 170 will be explained. To begin with, in the block portion 160, the cell extracting portion 16 separates the cell header from the cell (step 301). Thereupon, the header processing portion 167 checks whether or not the UPC memory 170a is connected to the block portion 160 (step 302).

Herein, if the UPC memory 170a is connected to the block portion 160, the header processing portion 167 collects pieces of data for the UPC from the UPC memory 170a (step 303).

Whereas if the UPC memory 170a is not connected to the block portion 160, the header processing portion 167 does not collect the UPC data but proceeds to a process of step 304.

Next, the header processing portion 167 checks whether or not the accounting memory 170b is connected to the block portion 160 (step 304).

Herein, if the accounting memory 170b is connected to the block portion 160, the header processing portion 167 collects pieces of accounting data from the accounting memory 170b (step 305).

Whereas if the accounting memory 170b is not connected to the block portion 160, the header processing portion 167 does not collect the accounting data but proceeds to a process of step 306.

Subsequently, the header processing portion 167 checks whether or not the VCI conversion memory 170c is connected to the block portion 160 (step 306).

Herein, if the VCI conversion memory 170c is connected to the block portion 160, the header processing portion 167 collects pieces of VCI conversion data from the VCI conversion memory 170c (step 307).

Whereas if the VCI conversion memory 170c is not connected to the block portion 160, the header processing portion 167 does not collect the VCI conversion data but proceeds to a process of step 308.

Further, the header processing portion 167 collects other items of data from the memory 168 and outputs the UPC data, the accounting data and the VCI conversion data to corresponding processing portions.

That is, the OAM portion 16 performs the OAM process on the OAM cell contained in the header (step 309a). Further, the UPC portion 14, if the UPC memory 170a is connected, executes the UPC process on the basis of the UPC data (step 309).

The accounting portion 15, if the accounting memory 170b is connected, performs the accounting process on the basis of the accounting data (step 309c). The header converting portion 18, if the VCI conversion memory 170c is connected, carries out the header process on the basis of the VCI conversion data (step 309d). Moreover, the cell inserting portion 164 performs a cell inserting process (step 310).

As discussed above, according to the embodiment 7, the UPC portion 14, the accounting portion 15, the header converting portion 18 and the OAM portion 16 that are provided in the block portion 160 employ one cell extracting portion 162 and one cell inserting portion 164 in common, and consequently the downsizing of the line interface 3C can be attained.

Further, the OAM portion partly constituting the basic processing unit, the UPC portion 14 and the accounting portion 15 that partly constitute the additional processing unit and also the header converting portion 18 are disposed together in the block portion 160 for performing the common processes, and, therefore, only a certain portion can not be separated. For this reason, the UPC memory 170a for storing the data needed for the additional processing, the accounting memory 170b and the VCI conversion memory 170c are separated outside.

Accordingly, if the UPC memory 170a is not connected, the all-band-width services can be offer by further reducing the hardware quantity. If the accounting memory 170b is not connected, the fixed accounting process can be provided by further reducing the hardware quantity. If the VCI conversion memory 170c is not connected, the UVP services through the private line can be offered by further reducing the hardware quantity.

<Embodiment 8>

Figure 14:
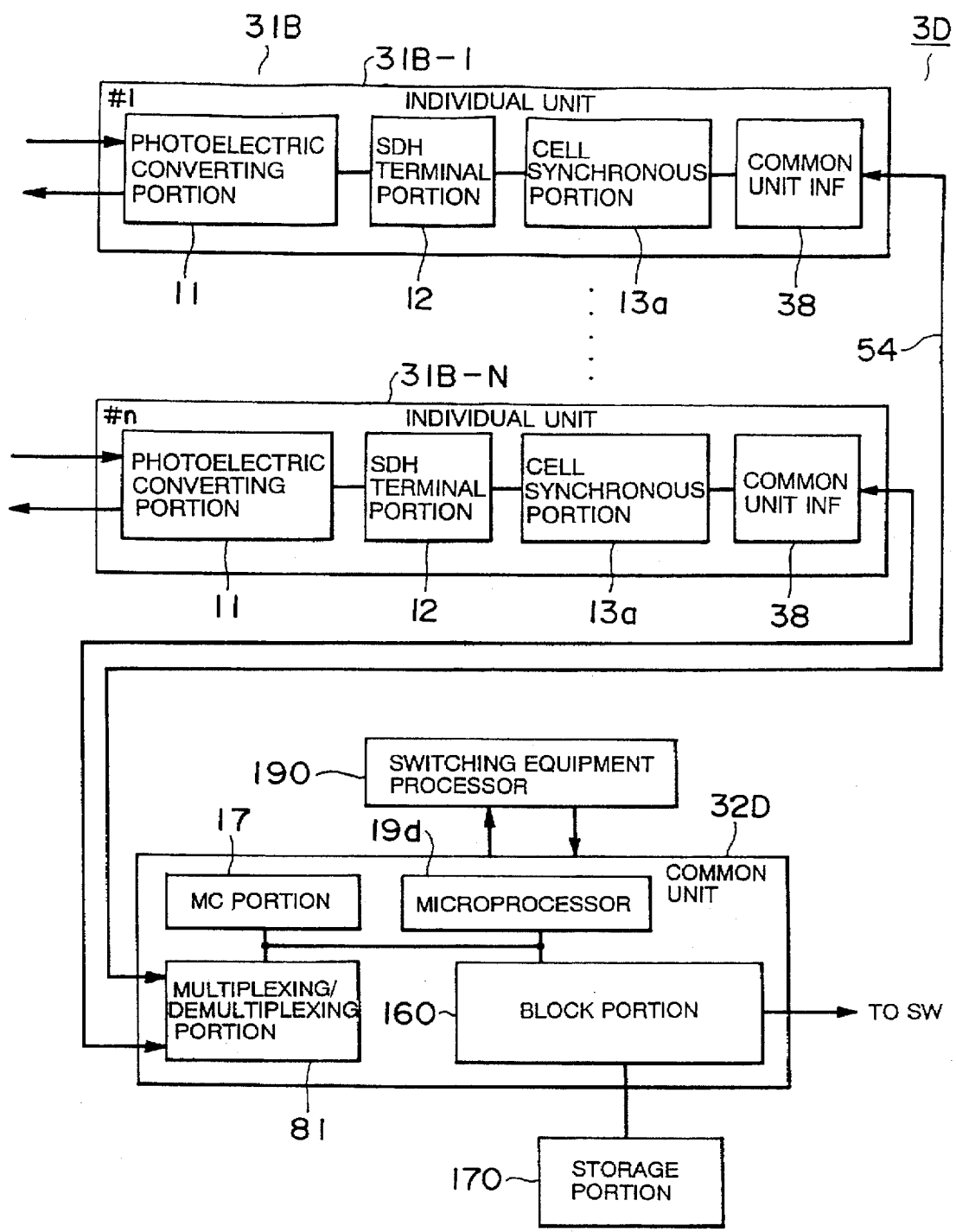
FIG. 14 is a diagram illustrating a construction of the line interface in an embodiment 8 of the present invention.

FIG. 14 illustrates a configuration of the line interface in an embodiment 8. The embodiment 8 provides a combination of the separate configuration of the individual unit and the common unit in the embodiment 6 with the separate configuration of the storage portion 170 from the block portion 160 in the embodiment 7.

Referring to FIG. 14, a line interface 3D includes the individual units 31B-1 through 31B-N, a common unit 32D connected to each of the individual units 31B-1 through 31B-N, the switching equipment processor 190 10 connected to the common unit 32D and the storage portion 170.

The configuration of each of the individual units 31B-1 through 31B-N has already been explained in the embodiment 6, and hence the detailed description thereof will be omitted. The common unit 32D is constructed of the MC portion 17, the multiplexing/demultiplexing portion 81 connected to each of the individual units, the block portion 160 connected to the multiplexing/demultiplexing portion 81 and the microprocessor 19d for controlling these portions. The storage portion 170 is disconnectably connected to the block portion 160.

The configurations of the block portion 160 and the storage portions 170 have already been explained in FIG. 12, and therefore their detailed descriptions will be omitted.

According to the above construction, since the same effects as those in the embodiments 6 and 7 are simultaneously obtained, the effect of the embodiment 8 is large.

<Embodiment 9>

Figure 15:
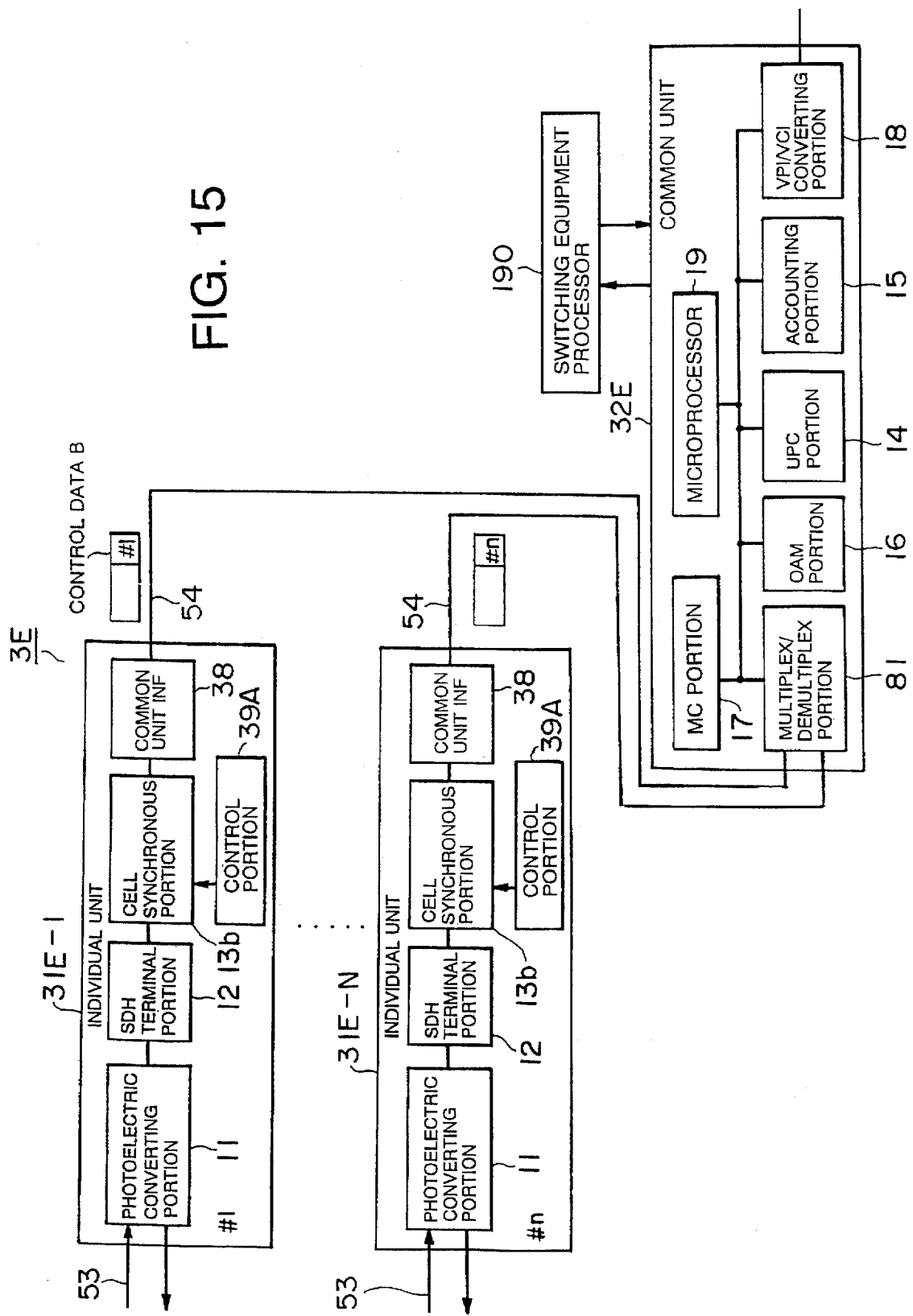
FIG. 15 is a diagram showing a construction of the line interface in an embodiment 9 of the present invention.

Next, an embodiment of the present invention will be discussed. FIG. 15 illustrates the line interface in the embodiment 9. In the embodiments 6 and 8, the services have been offered based on the unit of the common unit. In contrast with this, services different from per individual unit are offered in the embodiment 9.

Hereinafter, the construction of the embodiment 9 will be explained. A line interface 3E includes a plurality of individual units 31E-1 through 31E-N, a common unit 32E connected to each of the individual units and the switching equipment processor 190 connected to the common unit 32E.

Each of the individual units 31E-1 through 31E-N has the OE/EO converting portion 11, the SDH terminal portion 12, the cell synchronous portion 13b, a control portion 39A connected to the cell synchronous portion 13b and the common interface INF 38.

The common unit 32E incorporates the multiplexing/demultiplexing portion 81, the MC portion 17, the OAM portion 16, the UPC portion 14, the accounting portion 15, the VPI/VCI converting portion 18 and the microprocessor 19 for controlling these portions.

The switching equipment processor 190 inputs, from an switching center, an item of control data indicating whether or not a fixed charge declared by the subscriber should be imposed and outputs this item of data to the control portion 39A.

Each control portion 39A adds an identification flag for identifying the control portion itself and an item of control data indicating whether or not the self control portion should executes the accounting process, the UPC process and the OAM process with respect to the cell to the cell header contained in the cell and then outputs them to the cell synchronous portion 13B.

Figure 16:
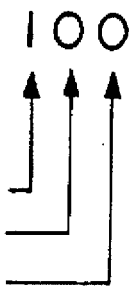
FIG. 16 is a diagram showing control data in the embodiment 9.

FIG. 16 shows the control data. As illustrated in FIG. 16, control data '100' consists of 3 bits, and a high-order 1 bit is an accounting invalid bit. The accounting invalid bit '1' indicates that no accounting process is carried out.

That is, the fixed charge is imposed irrespective of a count value of the number of cells. The next 1 bit is a UPC invalid bit which is herein set to '0' and hence indicates that the UPC process is to be conducted. A low-order bit is an OAM invalid bit which is herein set to '0' and therefore indicates that the OAM process is to be performed.

The microprocessor 19 of the common unit 32E determines whether or not the above process should be effected on the cell per line on the basis of the control data and the identification flag that are added to the cell header in the cell sent from the control portion 39A within each individual unit.

Figure 17:
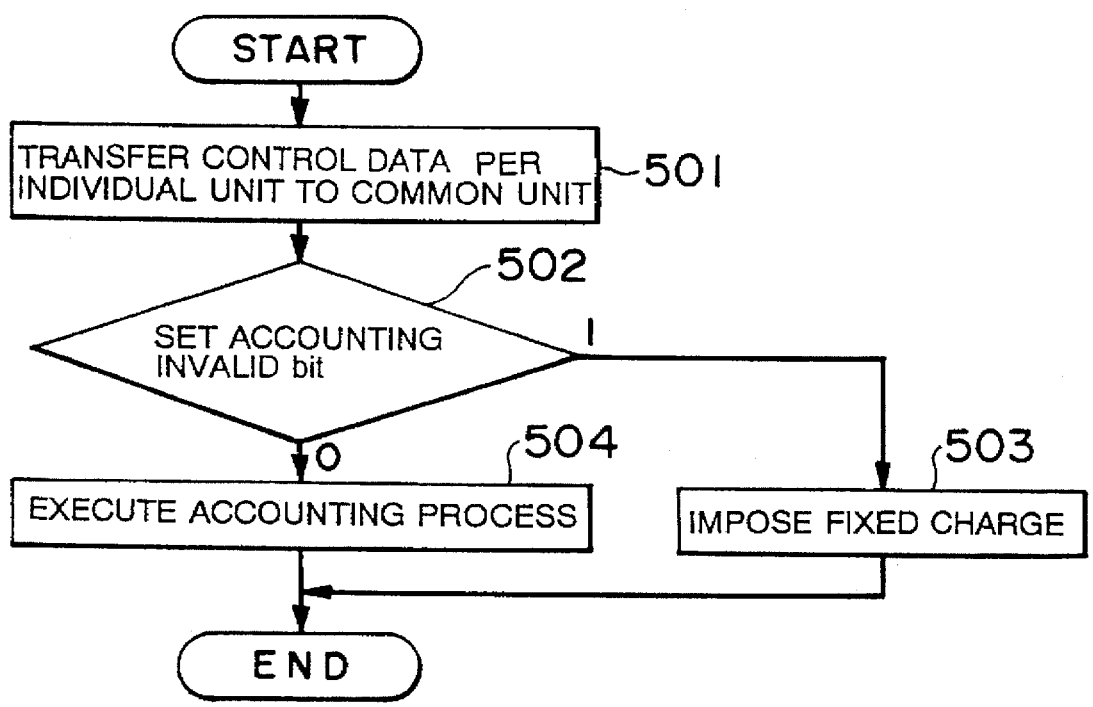
FIG. 17 is a flowchart showing operations of an accounting portion in the embodiment 9.

Next, the accounting process per individual unit will be explained with reference to FIG. 17. At the first onset, the subscriber declares receiving the imposition of the fixed charge on the unillustrated switching center. The switching equipment processor 190 outputs the control data shown in FIG. 16 on the basis of the above declaration. Each control portion 39A transfers the identification flag and the control data to the common unit 32E via the cell synchronous portion (step 501).

On the other hand, the common unit 32E recognizes which individual unit to apply in accordance with the identification flags among the identification flags and the control data that are contained in the headers of the respective cells sequentially inputted. The microprocessor 19 determines whether or not the accounting process should be effected on the cell per line on the basis of the control data (step 502).

In the example illustrated in FIG. 16, the accounting invalid bit is 1, and, therefore, the fixed charged is imposed on that line (step 503). Further, other UPC and OAM processes are normally conducted.

On the other hand, the accounting invalid bit is 0 depending on the individual unit. In this case, the accounting process is to be implemented (step 504).

Thus, the control data is transmitted per individual unit to the common unit, and hence the fixed accounting services can be offered based on the unit of the individual unit.

Note that the control data is written to the cell header in the embodiment but may be transferred directly to the common unit 32E from, e.g., other line.

Figure 18:
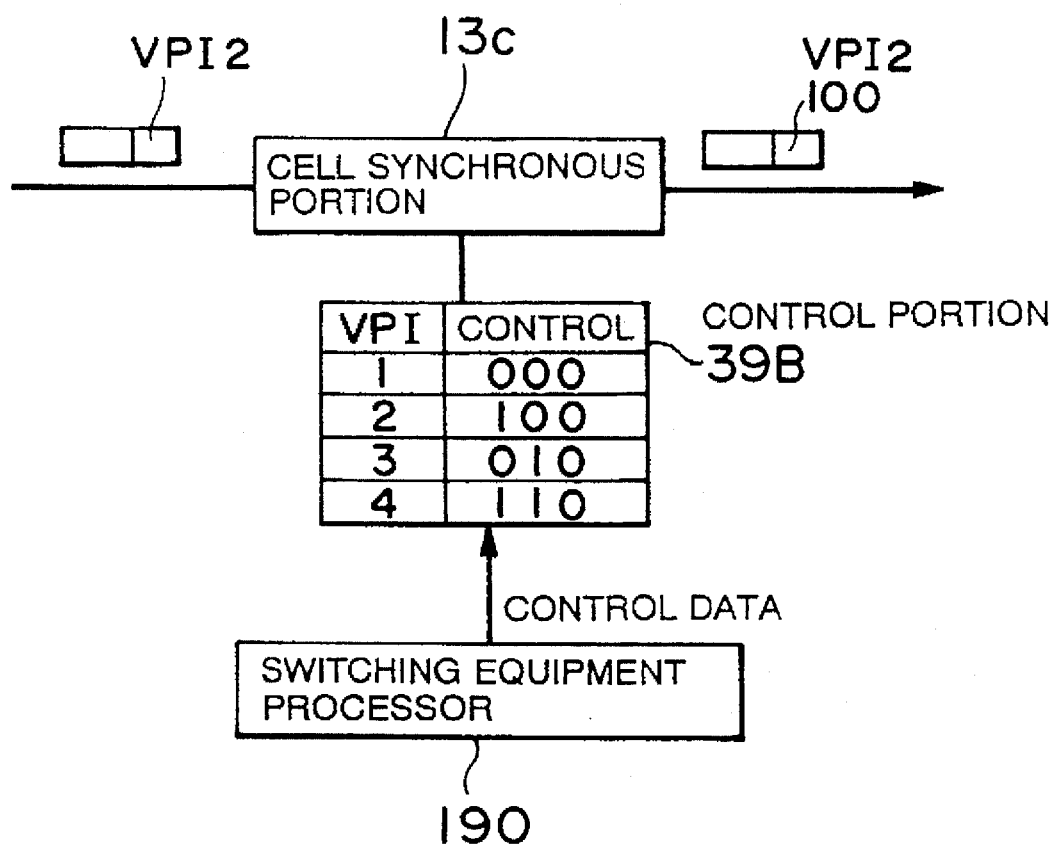
FIG. 18 is a diagram of assistance in explaining service control per VPI in the embodiment 9.
Figure 19:
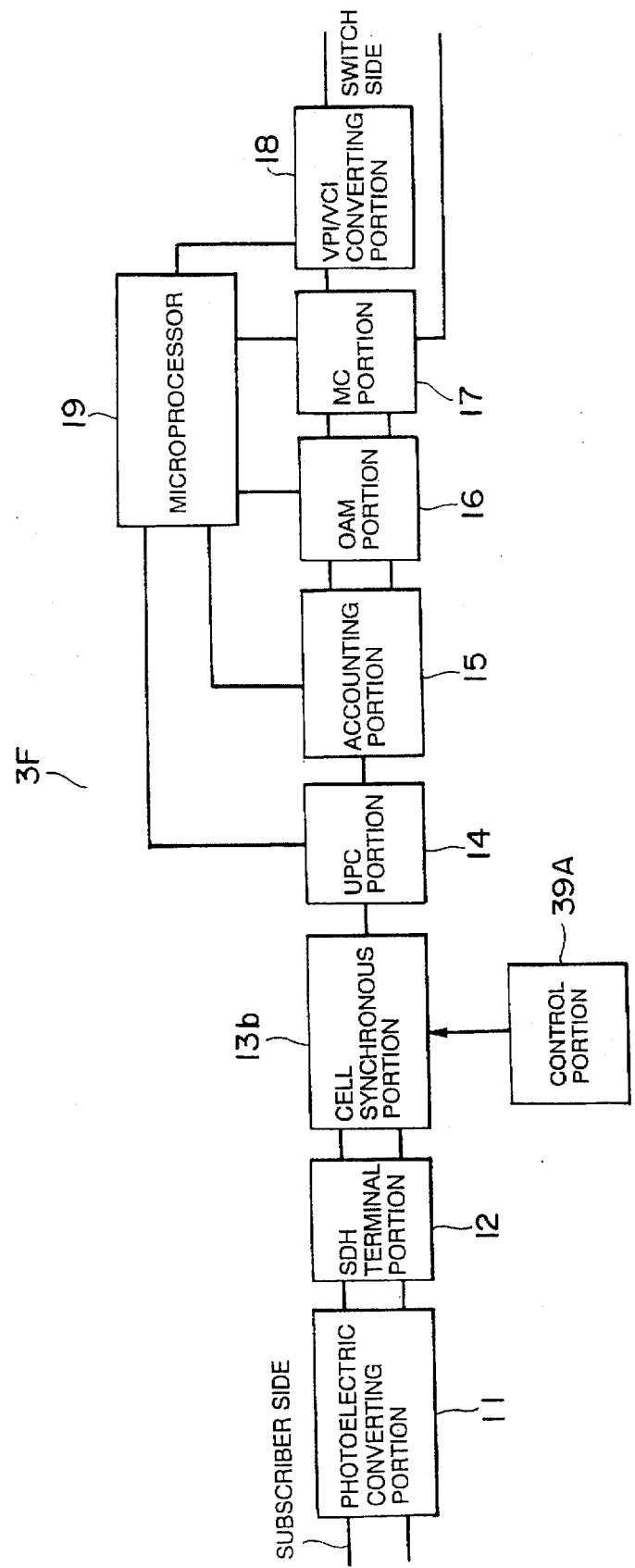
FIG. 19 is a diagram showing the line interface in the embodiment 9.
Figure 20:
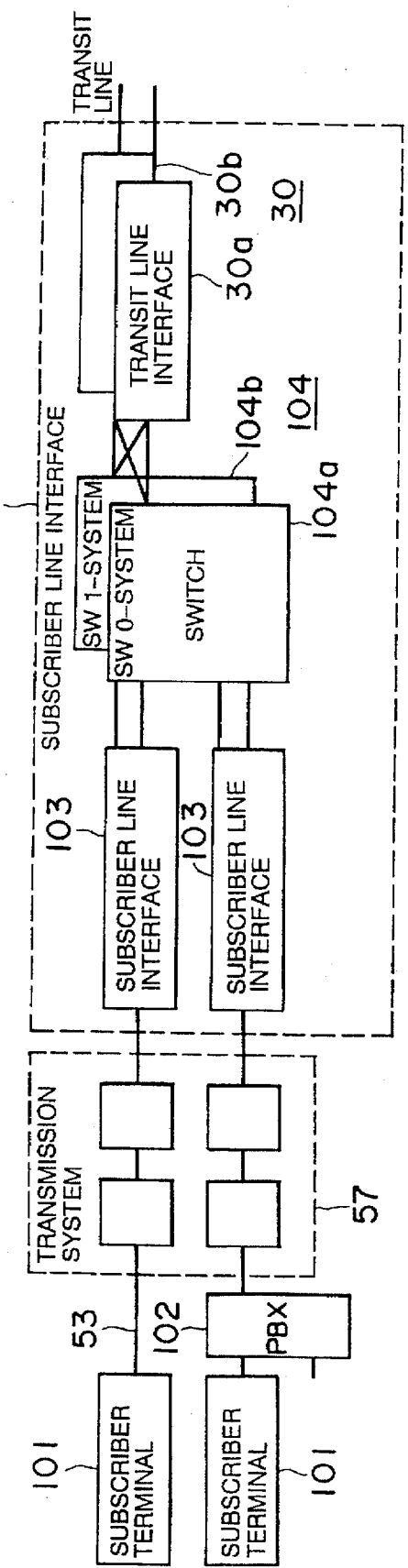
FIG. 20 ms a diagram illustrating an example of a construction of a conventional broadband ISDN.
Figure 21:
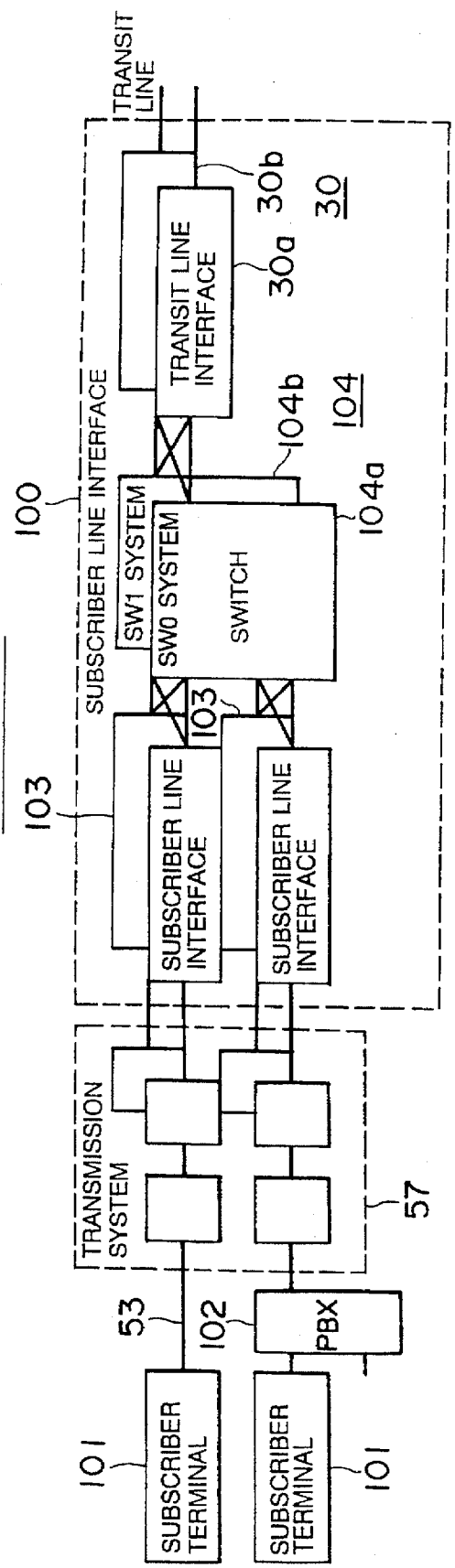
FIG. 21 is a diagram showing one example of a conventional dualized construction.
Figure 22:
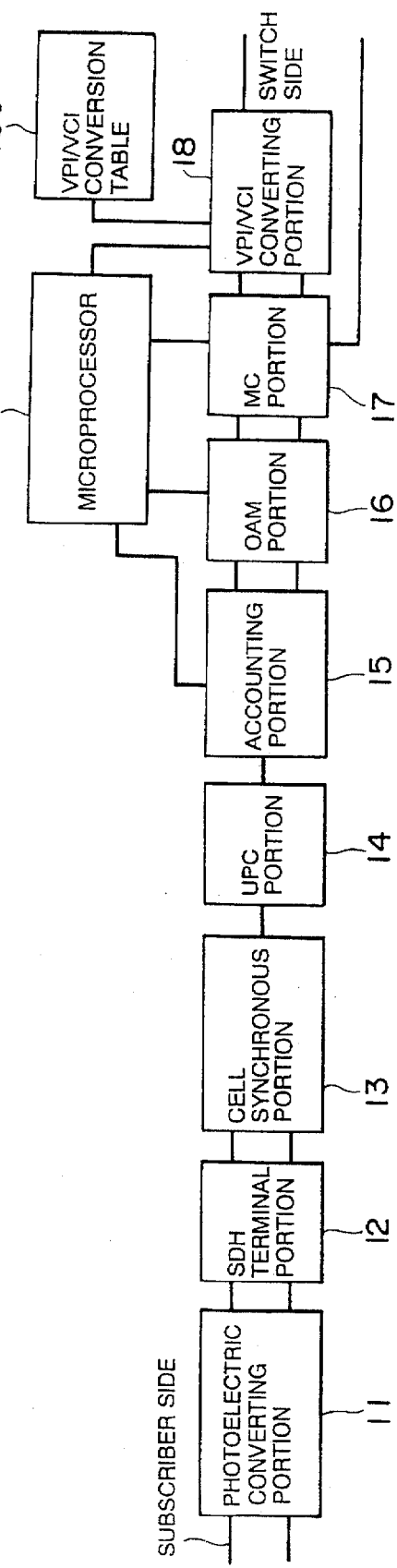
FIG. 22 is a diagram showing a construction of a conventional subscriber line interface.
Figure 23:
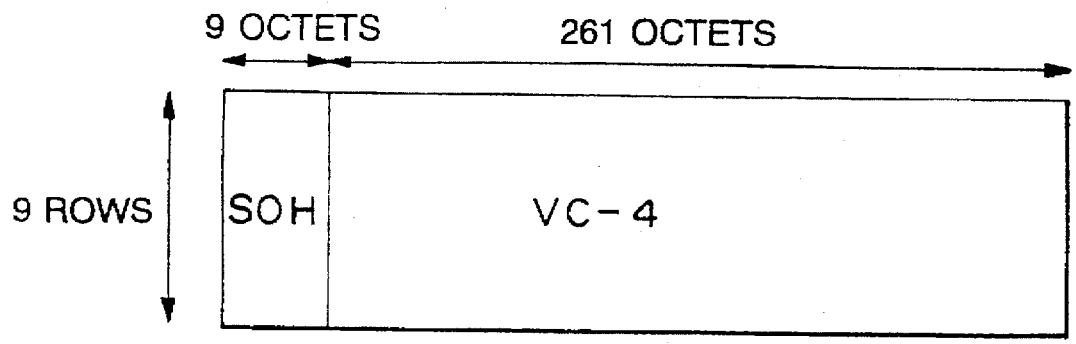
FIG. 23 is a diagram showing an SDH format.
Figure 24:
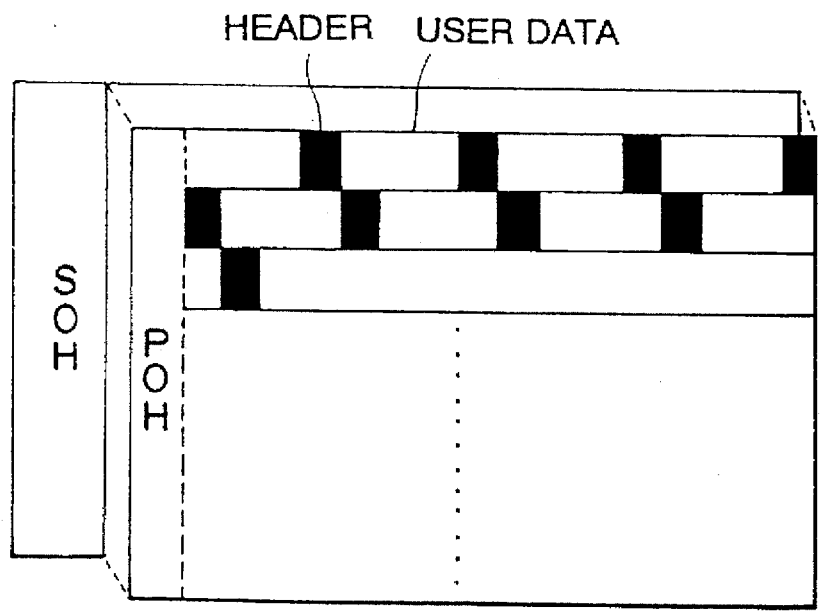
FIG. 24 is a diagram showing cell mapping to an SDH frame.

Moreover, FIG. 18 illustrates a modified example of the embodiment 5. Referring to FIG. 18, a control portion 39B sets the control data different per VPI in response to an indication given from the switching equipment processor 190 and outputs the control data different per VPI to the cell synchronous portion 13c. For example, the third VPI is set to '010', while the fourth VPI is set to '110'.

Accordingly, the UPC process is not effected in the third VPI. That is, all the band widths are to be used. In the fourth VPI, the UPC process and the OAM process are not conducted. According to the above-described construction, the services different per VPI can be offered.

<Embodiment 10>

Next, an embodiment 10 of the present invention will be described. In the embodiment 10, a line interface 3F is provided for every subscriber line. The line interface 3F includes the OE/EO converting portion 11, the SDH terminal portion 12, the cell synchronous portion 13, the control portion 39A connected to the cell synchronous portion, the UPC portion 14, the accounting portion 15, the OAM portion 16, the MC portion 17, the VPI/VCI converting portion 18 and the microprocessor 19.

The control portion 39A outputs the control data explained in the embodiment 5 to the cell synchronous portion 13b. The microprocessor 19 determines whether or not the cell should be processed based on the control data added to the cell header within the cell sent from the cell synchronous portion 13b.

Thus, even if the single line interface is provided corresponding to the single subscriber line, the services different depending on the invalid bit can be offered.

Further, even if the single line interface is provided corresponding to the single subscriber line, the control data may be set per VPI. In this case, the services different per VPI can be offered.

It is apparent that, in this invention, a wide range of different working modes can be formed based on the invention without deviating from the spirit and scope of the invention. This invention is not restricted by its specific working modes except being limited by the appended claims.

What is claimed is:

1. A switching equipment for switching a cell having a fixed length including a data and a header, said switching equipment comprising:

a line interface, accommodating a transmission line, for processing the cell received from the transmission line, said line interface including:

(a) a first processing unit for effecting a basic process on the cell; and (b) a second processing unit, operatively connected to said first processing unit, for performing an additional process on the cell;

wherein said second processing unit includes a plurality of processing blocks for performing a plurality of additional processes on the cell, each of said processing blocks being individually disconnectably connected to said first processing unit, and said first processing unit further includes a selecting portion for selecting, in case one or more processing blocks within said second processing unit are connected, said connected processing blocks and performing an additional process on the cell.

2. A switching equipment according to claim 1, wherein said second processing unit, as said plurality of processing blocks, includes:

a band management portion for managing a band width which should be used by a subscriber's terminal by monitoring a flow quantity of cells;

an accounting portion for collecting pieces of accounting data by counting the number of cells; and a virtual channel identifier converting portion for converting a virtual channel identifier written to the cell header contained in the cell into an output destination virtual channel identifier.

3. A switching equipment according to claim 1, wherein said first processing unit includes:

a terminal portion for terminating a transmission format of the data sent via the transmission line;

a cell synchronous portion, connected to said terminal portion, for performing a cell synchronous detection by effecting cell error control on the basis of an item of header error control data written to the cell header contained in the cell;

an alarm transfer cell management portion, connected to said cell synchronous portion, for managing an alarm transfer cell;

a monitoring cell portion, connected to said alarm transfer cell management portion, for measuring at least one of a cell error characteristic, a cell loss characteristic and a cell delay characteristic by use of a monitoring cell; and a virtual path identifier converting portion, connected to said monitoring cell portion, for converting a virtual path identifier written to the cell header contained in the cell into an output destination virtual path identifier.

4. A switching equipment according to claim 1, wherein said second processing unit includes:

an additional executing portion, for executing the additional process on the cell, already connected to said first processing unit; and a storage portion, for storing data needed for said additional executing portion to execute the additional process, separated from said first processing unit but disconnectably connected to said first processing unit.

5. A switching equipment according to claim 4, wherein said first processing unit includes:

a first processing portion for executing the process on the cell in real time; and a second executing portion for executing the process on the cell while permitting a time lag, said second processing portion incorporating said additional executing portion, said second processing portion having:

(a) a cell extracting portion for extracting header data contained in the cell and alarm transfer cell data;

(b) a cell processing portion for performing a plurality of processes on the basis of the header data and the alarm transfer cell data that are extracted by said cell extracting portion; and (c) a cell inserting portion for controlling the cell transmitted from said cell extracting portion on the basis of a result of the processing by said cell processing portion and inserting the alarm transfer cell data.

6. A switching equipment according to claim 5, said cell processing portion includes:

a band management portion for managing a band width to be used by a subscriber by giving an indication to dispose of the cell if the number of cells exceeds a predetermined quantity on the basis of the header data;

a header converting portion for converting virtual path identifier and a virtual channel identifier within the header data into an output destination virtual path identifier and an output destination virtual channel identifier;

an accounting portion for collecting pieces of accounting data by counting the number of cells; and an alarm transfer cell management portion for managing the alarm transfer cell data.

7. A switching equipment according to claim 4, wherein said storage portion includes:

a plurality of storage blocks for storing data required for performing a plurality of additional processes on the cell, each of said storage blocks being individually disconnectably connected to said first processing unit.

8. A switching equipment according to claim 7, wherein said cell processing portion further includes:

a header processing portion for selecting, in case one or more of said storage blocks are connected, said connected storage blocks on the basis of the header data and the alarm transfer cell data that are extracted by said cell extracting portion and effecting the additional processes by use of the data in said selected storage blocks.

9. A switching equipment for a switching a cell having a fixed length including a data and a header, said switching equipment comprising:

a line interface, accommodating a plurality of transmission lines, for processing the cell received from the respective transmission lines, said line interface including:

(A) individual units, connected respectively to the plurality of transmission lines accommodated therein, for individually performing a cell process; and (B) a common unit, connected to said individual units, for batch-processing the cells processed by said individual units, said common unit having:

(a) a first processing unit for effecting a basic process on the cell; and (b) a second processing unit, operatively connected to said first processing unit, for effecting an additional process on the cell;

wherein said second processing unit includes a plurality of processing blocks for executing a plurality of additional processes on the cell, each of said processing blocks individually disconnectably connected to said first processing unit, and wherein said first processing unit further includes a selecting portion for selecting, in case said one or more processing blocks within said second processing unit are connected, said connected processing blocks and performing the additional processes on the cell.

10. A switching equipment according to claim 9, wherein the second processing unit includes:

a band management portion for managing a band width which should be used by a subscriber's terminal by monitoring a flow quantity of the cells;

an accounting portion for collecting pieces of accounting data by counting the number of cells; and a virtual channel identifier converting portion for converting a virtual channel identifier written to the cell header contained in the cell into an output destination virtual channel identifier.

11. A switching equipment according to claim 9, wherein said first processing unit within said common unit includes:

an alarm transfer cell management portion for managing an alarm transfer cell;

a monitoring cell portion, connected to said alarm transfer cell management portion, for measuring at least one of a cell error characteristic, a cell loss characteristic and a cell delay characteristic by use of a monitoring cell; and a virtual path identifier converting portion for converting a virtual path identifier written to the cell header contained in the cell into an output destination virtual path identifier.

12. A switching equipment according to claim 9, wherein each of said individual transmission units includes:

a terminal portion for terminating a transmission format of the data sent via the transmission line; and a cell synchronous portion, connected to said terminal portion, for performing a cell synchronous detection by effecting cell error control on the basis of an item of header error control data written to the cell header contained in the cell.

13. A switching equipment according to claim 9, wherein said second processing unit includes:

an additional executing portion, for executing the additional process on the cell, already connected to said first processing unit; and a storage portion, for storing data needed for said additional executing portion to execute the additional process, separated from said first processing unit but disconnectably connected to said first processing unit.

14. A switching equipment according to claim 13, wherein said first processing unit includes:

a first processing portion for executing the process on the cell in real time; and a second executing portion for executing the process on the cell while permitting a time lag, said second processing portion incorporating said additional executing portion, said second processing portion having:

(a) a cell extracting portion for extracting header data contained in the cell and alarm transfer cell data;

(b) a cell processing portion for performing a plurality of processes on the basis of the header data and the alarm transfer cell data that are extracted by said cell extracting portion; and (c) a cell inserting portion for controlling the cell transmitted from said cell extracting portion on the basis of a result of the processing by said cell processing portion and inserting the alarm transfer cell data.

15. A switching equipment according to claim 14, wherein said storage portion includes:

a plurality of storage blocks for storing data required for performing a plurality of additional processes on the cell, each of said storage blocks being individually disconnectably connected to said first processing unit.

16. A switching equipment according to claim 15, wherein said cell processing portion further includes:

a header processing portion for selecting, in case one or more of said storage blocks are connected, said connected storage blocks on the basis of the header data and the alarm transfer cell data that are extracted by said cell extracting portion and effecting the additional processes by use of the data in said selected storage blocks.

17. A switching equipment according to claim 14, wherein said cell processing portion includes:

a band management portion for managing a band width to be used by a subscriber by giving an indication to dispose of the cell if the number of cells exceeds a predetermined quantity on the basis of the header data;

a header converting portion for converting a virtual path identifier and a virtual channel identifier within the header data into an output destination virtual path identifier and an output destination virtual channel identifier;

an accounting portion for collecting pieces of accounting data by counting the number of cells; and an alarm transfer cell management portion for managing the alarm transfer cell data.

18. A switching equipment according to claim 17, wherein said storage portion includes:

a band management memory for storing the data needed for the processing by said band management portion;

an accounting memory for storing accounting data required for the processing by said accounting portion; and a virtual channel memory for storing the data required for converting the virtual channel identifier by said header converting portion.

19. A switching equipment for a switching a cell having a fixed length including a data and a header, said switching equipment comprising:

a line interface, accommodating a plurality of transmission lines, for processing the cell received from the respective transmission lines, said line interface including:

(A) individual units, connected respectively to the plurality of transmission lines accommodated therein, for individually performing a cell process; and (B) a common unit, connected to said individual units, for batch-processing the cells processed by said individual units, each of said individual units having:

(a) a control portion for adding, to the cell header contained in the cell, an identification flag for identifying said individual unit itself and an item of control data indicating whether or not the cell should be processed per said individual unit, wherein a cell processing portion determines whether or not the cell should be processed per line on the basis of the identification flag and control data that are added to the cell header in the cell transmitted from the control portion within said each individual unit.

20. A switching equipment according to claim 19, wherein said control portion adds, to the cell header, the control data indicating whether or not the cell should be processed per virtual path identifier added to the cell header in each of the cells sequentially inputted to said each individual unit, and said cell processing portion determines whether or not the cell should be processed per virtual path identifier on the basis of the control data added to the cell header in the cell transmitted from said control portion within said each individual unit.

21. A switching equipment for switching a cell having a fixed length including a data and a header, said switching equipment comprising:

a line interface, accommodating a transmission line, for processing the cell received from the transmission line on the unit of cell, said line interface including:

(a) a control portion for adding control data indicating whether or not the cell should be processed to the cell header contained in the cell; and (b) a cell processing portion for determining whether or not the cell should be processed based on the control data added to the cell header within the cell transmitted from said control portion, wherein said control portion adds, to the cell header, the control data indicating whether or not the cell should be processed per virtual path identifier added to the cell header in each of the cells sequentially inputted, and said cell processing portion determines whether or not the cell should be processed per virtual path identifier on the basis of the control data added to the cell header in the cell transmitted from said control portion.

\* \* \* \* \*